US011444945B1

(12) United States Patent
Ford

(10) Patent No.: US 11,444,945 B1
(45) Date of Patent: Sep. 13, 2022

(54) COMPUTER CHALLENGE SYSTEM FOR PRESENTING IMAGES TO USERS CORRESPONDING TO CORRECT OR INCORRECT REAL-WORLD PROPERTIES TO LIMIT ACCESS OF COMPUTER RESOURCES TO INTENDED HUMAN USERS

(71) Applicant: Arkose Labs Holdings, Inc., San Francisco, CA (US)

(72) Inventor: Matthew Michael Ford, Brisbane (AU)

(73) Assignee: Arkose Labs Holdings, Inc., San Mateo, CA (US)

( * ) Notice: Subject to any disclaimer, the term of this patent is extended or adjusted under 35 U.S.C. 154(b) by 0 days.

(21) Appl. No.: 17/208,491

(22) Filed: Mar. 22, 2021

(51) Int. Cl.
  *G06F 3/0482* (2013.01)
  *H04L 9/40* (2022.01)
  *G06T 17/00* (2006.01)
  *G06T 11/00* (2006.01)

(52) U.S. Cl.
  CPC ........ *H04L 63/0884* (2013.01); *G06F 3/0482* (2013.01); *G06T 11/00* (2013.01); *G06T 17/00* (2013.01); *H04L 63/10* (2013.01); *G06T 2200/24* (2013.01); *H04L 63/0853* (2013.01)

(58) Field of Classification Search
  USPC .......................................................... 726/6
  See application file for complete search history.

(56) References Cited

U.S. PATENT DOCUMENTS

| | | | | |
|---|---|---|---|---|
| 8,397,275 B1* | 3/2013 | Magdsick | ............... | G06F 21/31 380/54 |
| 10,614,207 B1* | 4/2020 | Truong | ................... | G06T 11/00 |
| 10,832,485 B1* | 11/2020 | Mantri | .................... | G06F 3/017 |
| 11,227,232 B2* | 1/2022 | Chari | .................. | H04L 63/1425 |
| 2008/0216163 A1* | 9/2008 | Pratte | ...................... | G06F 21/36 726/7 |
| 2011/0208716 A1* | 8/2011 | Liu | ........................ | G06F 16/583 707/E17.108 |
| 2013/0031640 A1* | 1/2013 | Fisk | ........................ | G06F 21/36 726/28 |
| 2015/0317700 A1* | 11/2015 | Ford | ...................... | G06F 21/36 705/71 |

(Continued)

*Primary Examiner* — Reza Nabi
(74) *Attorney, Agent, or Firm* — Womble Bond Dickinson (US) LLP

(57) ABSTRACT

A method of securing a computer resource against unauthorized access by authenticating user devices attempting to access the computer resource comprises determining a three-dimensional (3D) model of a virtual scene, wherein elements of the virtual scene are selected consistent with human expectations, generating a data record for the 3D model, wherein the data record includes references to pre-determined set of human expectations about the virtual scene, generating a two-dimensional (2D) image of the virtual scene, sending a challenge data structure to a user device, wherein the challenge data structure includes the 2D image, obtaining a user response representing a user-provided set of expectations about the virtual scene, determining whether the user-provided set of expectations is consistent with the pre-determined set of human expectations, and providing access to the computer resource for the user device based on whether the set of expectations is consistent with the pre-determined set of human expectations.

16 Claims, 20 Drawing Sheets

(56) References Cited

U.S. PATENT DOCUMENTS

| | | | |
|---|---|---|---|
| 2015/0319153 A1* | 11/2015 | Tartz | H04L 63/08 |
| | | | 726/4 |
| 2017/0161477 A1* | 6/2017 | Liu | G06N 7/005 |
| 2017/0161490 A1* | 6/2017 | Fedor | G06F 21/31 |
| 2017/0180348 A1* | 6/2017 | Piccolotto | G06V 40/45 |
| 2017/0262623 A1* | 9/2017 | Plenderleith | G06F 21/36 |
| 2017/0316191 A1* | 11/2017 | Sipos | G06F 21/31 |
| 2019/0188371 A1* | 6/2019 | Shen | G06F 21/36 |
| 2019/0303555 A1* | 10/2019 | Agarwal | G06T 3/40 |
| 2020/0097643 A1* | 3/2020 | Uzun | G06F 21/32 |
| 2020/0134157 A1* | 4/2020 | Wu | G06F 3/04883 |
| 2020/0134159 A1* | 4/2020 | Ford | G06F 21/36 |
| 2020/0364324 A1* | 11/2020 | Ganeshmani | G06F 21/62 |
| 2020/0410081 A1* | 12/2020 | Topaloglu | G06T 13/20 |
| 2021/0133317 A1* | 5/2021 | Pham | G06F 21/36 |
| 2021/0319099 A1* | 10/2021 | Gaddam | G06N 20/10 |
| 2022/0147609 A1* | 5/2022 | Kim | G06F 21/36 |

* cited by examiner

COMPUTER CHALLENGE SYSTEM FOR PRESENTING IMAGES TO USERS CORRESPONDING TO CORRECT OR INCORRECT REAL-WORLD PROPERTIES TO LIMIT ACCESS OF COMPUTER RESOURCES TO INTENDED HUMAN USERS

FIELD

The present disclosure generally relates to controlling access to computer resources to limit automated and unintended accessing of the computer resources. The disclosure relates more particularly to apparatus and techniques for presenting challenges to users that require inference to real-world properties.

BACKGROUND

Computer resources are often created for access by humans and the creators might seek to reduce or block access to those computer resources when the access is by unintended users such as an automated process that is attempting access or by unintended human users who might be attempting to access the computer resources in ways unintended or undesired by their creators. For example, a web server serving web pages related to a topic might be set up for human users to browse a few pages but not set up for an automated process to attempt to browse and collect all available pages or for persons employed to scrape all of the data. As another example, a ticket seller might wish to sell tickets to an event online, while precluding unauthorized resellers from using an automated process to scrape data off the ticket seller's website and buy up large quantities of tickets.

Unauthorized access and/or unwanted access to computer resources might be used to cause damage, such as highly-repetitive access to a computer resource in order to block others from accessing it, causing servers to crash, flooding comment sections with messages, creating a large number of fictitious identities in order to send spam or bypass limits, skewing results of a vote or poll, entering a contest many times, brute force guessing of passwords or decryption keys, or the like. There is a need for systems to perform user authentication, such as presenting authentication challenges in order to distinguish authorized users of a computing asset from unauthorized users. Unauthorized users might include unauthorized human users, users attempting to bypass controls ("bypassers"), and/or unauthorized automated agents.

In some cases, a provider of computer resources wants to determine whether a given user accessing those computer resources is a legitimate human user, an automated process, or a bypasser, given that access to the resources would be computer-mediated in each case. For example, companies and other organizations might create materials and make them available online, sometimes via intermediaries that charge per view. These organizations might spend huge sums, or make significant efforts, in creating and disseminating these materials, but need to ensure that real, human consumers in their target audience view particular materials, as automated agents can generate false impressions that someone in the target audience has viewed the materials when in fact no real human in the target audience has done so. In some cases, there might be humans accessing that content, but not be in the target audience, such as someone deployed to access the content without viewing the materials. Companies and other organizations lose the effect of the money they pay by spending for these false impressions by unintended users, whether human or not.

Some software and/or hardware solutions have been proposed to filter access so that access is limited to human users. Authentication programs are commonly used to ensure that information entered into a computer, such as via a web site, is entered by a human user of a computing device rather than by an automated program, such as a computer-executed "bot" or "agent." One example of such an authentication program presents a string of random characters to a user and ask the user to enter the presented characters. If the user enters the characters correctly, the user is allowed to proceed to the computer resource that is protected by the authentication program.

However, agents have adapted to include character recognition in order to circumvent such authentication programs. In response, authentication programs such as CAPTCHA ("Completely Automated Public Turing test to tell Computers and Humans Apart") programs have been developed to disguise test characters, for example by adding background noise, or randomly positioning the characters on the screen, rather than in pre-defined rows. Although such programs are somewhat successful at preventing agents from accessing a computer, it also can be difficult for human users to read such disguised characters. As such, CAPTCHA authentication programs often can be frustrating and tedious to use.

There is therefore a need for an improved method and system for providing for user authentication in accessing computer resources.

SUMMARY

An authentication system, in an embodiment, outputs challenges to user devices, such as user devices, and then notes user responses from those user devices, and determines whether to provide those user devices with access to computer resources or indicates to another computer system whether to provide that access. In part, the challenges can serve to allow for easy access for encouraged users the system operator is providing access for, while precluding, blocking, and/or stymying access from discouraged users, which might be users using automated systems to obtain access in undesirable ways or users deploying human accessors ("bypassers") who are employed to bypass the challenges, as might be the case where a third party employs a large number of people who have no interest in content or resources provided by the computer system operator but who are tasked with bypassing the challenges to permit discouraged uses of the computer system.

In some embodiments, the authentication system indicates a value from a range of values representing a relative certainty that a responding user device is responding with encouraged human input or discouraged input (automated input or human input of bypassers tasked with bypassing the controls). In part, the challenges can be in the form of images that illustrate some real-world property, preferably that a human would readily recognize and an automated system or a team of bypassers, would have difficulty responding to. In some embodiments, the challenges are such that they are not much of a noticeable burden on an encouraged user, such as a person in the intended audience or in the user pool of the operator of the computer resource being controlled, but are difficult or impossible for an unintended user or automated system attempting to access the resources being controlled, and/or perhaps cost ineffective for such unintended access.

As one example, a challenge might involve a user forming a mental image from a two-dimensional (2D) rendering of a three-dimensional (3D) virtual object with simulated real-world properties. As another example, the user might be presented with two sequences of images and be asked to indicate which sequence is in logical order. As yet another example, the user might be asked about properties of a virtual object in an image where the properties are something that a human could easily recognize and that an automated process might not be able to process correctly.

The authentication system might also find use in partially-automated schemes, such as a "sweatshop" operation wherein a group of people, e.g., bypassers, are employed at low wages to attempt to bypass controls or tasked with quickly solving challenges so that an automated system can take over and get access to the controlled computer resources without those people actually being the target users. In any case, perfect authentication is often not required and it might be sufficient that an authentication system can block or slow enough access that it becomes infeasible or unprofitable for a bypasser operation or an automated attempt to bypass authentication, such as by requiring considerable programming and implementation effort on the part of bypassers to increase the effort and expense needed beyond the effort and expense demanded of the human user.

In part, this might be done by causing sweatshop operations, or suspected sweatshop operations, to undergo a long series of time-sapping challenges that, although the sweatshop operations involve humans, create enough of a cost in wages to the sweatshop operation that it becomes infeasible or unprofitable to try and obtain unauthorized access to computer resources.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which.

DETAILED DESCRIPTION

Figure 1:
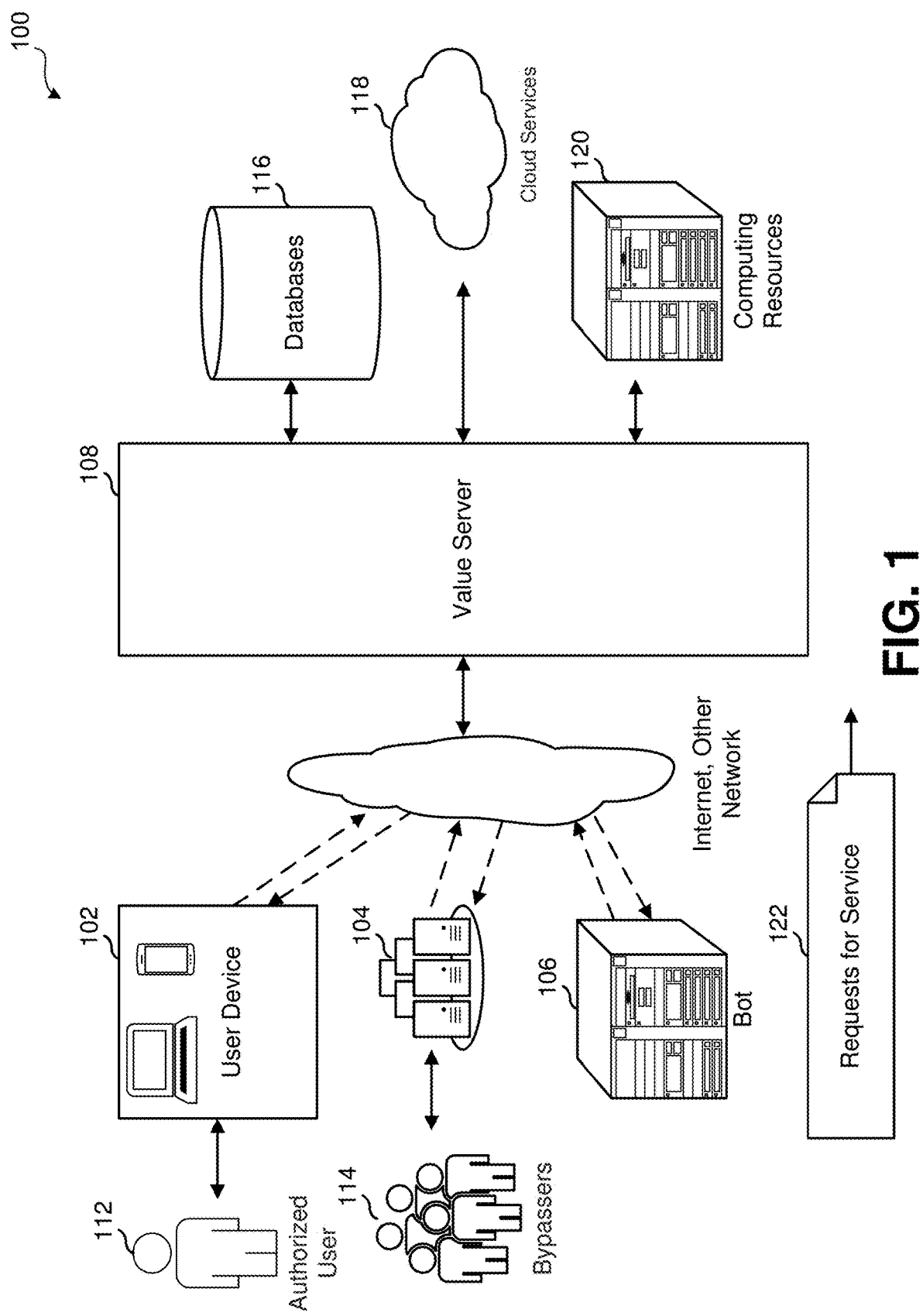
FIG. 1 is a block diagram of a network environment wherein an authentication challenge system might be deployed, according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include presenting computer authentication challenges and processing responses to computer authentication challenges. An authentication challenge might be issued and managed by an authentication program or system used to ensure that information entered into a computer, such as via a web site, is entered by a human user of a computing device rather than by an automated program commonly known as a bot or an agent. Agents are commonly used by computer hackers in order to gain illicit entry to web sites, or to cause malicious damage, for example by creating a large amount of data in order to cause a computer system to crash, by creating a large number of fictitious membership accounts in order to send spam, by skewing results of a vote or poll, by entering a contest many times, or by guessing a password or decryption key through a brute force method, etc. Thus, it can be desirable to detect such activities to block or limit them.

One example of such a user authentication program might present a string of arbitrary characters to a user and prompt the user to enter the presented characters. If the user enters the characters correctly, the user is allowed to proceed. Automated agents that have adapted to include character recognition might be able to circumvent such authentication programs. Authentication programs such as CAPTCHA ("Completely Automated Public Turing test to tell Computers and Humans Apart") programs have been developed to disguise test characters, for example by adding background noise, or randomly positioning the characters on the screen, rather than in pre-defined rows. Although such programs are successful at preventing some agents from accessing a computer, it also can be difficult for authorized human users to read such disguised characters. As such, character-based CAPTCHA authentication programs often can be frustrating and tedious to use.

Authentication programs might be able to be bypassed by somewhat sophisticated agents that can determine the requested answer despite the disguise. As such, character-based CAPTCHA authentication programs often fail to prevent automated abuse of the protected computer system.

Another example of a user authentication program might present a grid of photographs to a user and prompt the user to select one or more photographs that meet a stated criterion (e.g., "From the displayed pictures, select those that contain construction vehicles"). Although such programs can be successful at preventing some agents from accessing a computer, it also can be difficult for human users to decide whether the instruction applies or does not apply to photographs with ambiguous contents, such as whether a consumer-grade sports utility vehicle should be regarded as a construction vehicle. As a result, photo-based CAPTCHA authentication programs often can be frustrating and tedious to use for authorized users.

Such authentication programs might be able to be bypassed by somewhat sophisticated agents that can automatically recognize the contents of photographs and so such photo-based CAPTCHA authentication programs can fail to prevent automated abuse of the protected computer system.

An authentication system that can be bypassed by a merely somewhat sophisticated agent can motivate computer hackers to invest a small amount of labor to create such an agent, provided that the reward for bypassing the authentication system is greater than the investment that must be made to create the agent. On the other hand, an authentication system that can only be bypassed by a highly sophisticated agent might discourage computer hackers from investing the large amount of labor needed to create such an agent, as the reward for bypassing the authentication system might be smaller than the investment that must be made to create the agent.

Authentication system design therefore often takes into account these considerations, to provide a method and system for user authentication that is both easy for authorized users to pass without frustration and tedium and very difficult for unauthorized users, or at least create enough of a cost for unauthorized users to discourage investment of labor into creating a work-around.

Elements of an Exemplary Hardware System

An authentication challenge system might be coupled with a value server that serves or manages some protected computer resource that can be accessed by user devices and is to be protected by the authentication challenge system against unauthorized user device access while permitting authorized user devices to access the value server, to some level of protection. The level of protection might not be absolute in that some authorized user devices might be blocked from access and some unauthorized user devices might obtain access.

FIG. 1 is a block diagram of a network environment 100 wherein an authentication challenge system might be deployed, according to an embodiment. In the example shown there, a user device 102, a set of bypasser devices 104, and a bot 106 might be attempting to obtain services from a value server 108. It is assumed in this example that a user 112 operating user device 102 is an authorized user for whom an operator of value server 108 is willing to provide services to, whereas the operator is not willing to provide services to bypassers 114 using set of bypasser devices 104 or to bot 106. The particular services provided are not particularly relevant to processes of trying to allow authorized access and trying to prevent unauthorized access, but examples are illustrated, including databases 116, cloud services 118, and computing resources 120. Those services might include serving webpages and interactions with users. Various devices might send requests 122 for services and receive in response the requested services, receive a challenge (possibly followed by the requested services if the challenge is met), or receive a rejection message. As explained herein, the challenge could be a process that is designed to filter out requesters based on an ability to meet a challenge, where meeting the challenge requires some real-world experience not easily emulated by a computer—thus potentially blocking bot 106 from accessing services—and that is potentially time-consuming for bypassers to work on—thus potentially making the requests economically infeasible for a hired set of bypassers or other bypassers who might not be interested in the requested services as much as bypassing controls for others or for various reasons, all while limiting a burden on an authorized legitimate user of the services.

Figure 2:
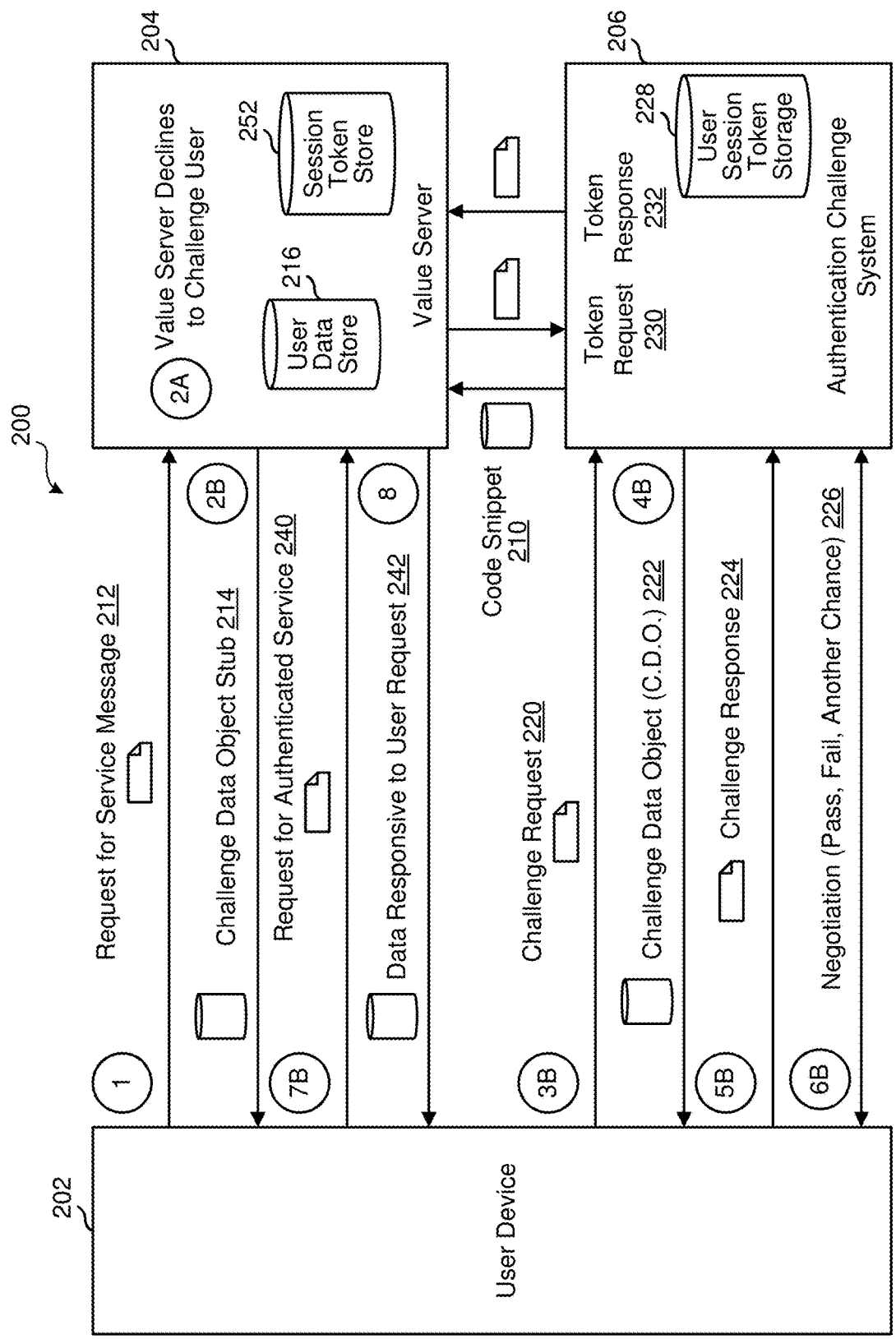
FIG. 2 is a block diagram of an authentication challenge system and exemplary components, according to an embodiment.

FIG. 2 is a block diagram of an authentication challenge system 200 and exemplary components, according to an embodiment. Messages and data objects that are passed among components are shown in greater detail than in FIG. 1, but user device 202 in FIG. 2 might correspond to user device 102 in FIG. 1, a bypasser device of FIG. 1, or bot 106 of FIG. 1, while value server 204 might correspond to value server 108 of FIG. 1. That said, those like components might be different or differently configured.

Also illustrated in FIG. 2 are indicators of a typical order of steps of communications among user device 202, value server 204, and an authentication challenge system 206. It should be noted that other orders of steps might be taken, and some steps might be omitted or added. In a precursor step, authentication challenge system 206 might supply value server 204 a code snippet 210 usable by value server 204 for handling challenges.

In an operational process illustrated, user device 202 sends a "request for service" message 212 to value server 204 (referenced as communication "1"). Value server 204 then determines whether a challenge is needed and either declines to challenge the user making the request (communication 2A) or to challenge the user making the request. For example, where user device 202 is already logged in and authenticated to value server 204, value server 204 might have enough information to be able to skip a challenge process and might just respond to the user request immediately.

In the case where value server 204 decides to challenge, value server 204 sends (communication 2B) a challenge data object (C.D.O.) stub 214 to user device 202. C.D.O. stub 214 might have been supplied as part of code snippet 210. In some embodiments, what is sent is an entire C.D.O. as explained herein elsewhere. In some embodiments, as explained herein elsewhere, C.D.O. stub 214 might include information about the user or the request and such information might be encrypted or signed such that user device 202 cannot easily alter the information without that alteration being detected. Such information might include details about the user that are known to value server 204, such as an IP address associated with the request, country of origin of the request, past history of the user, if known, etc. This data might be stored as user data in user data store 216.

C.D.O. stub 214 might be code, a web page, or some combination that is designed to have user device 202 issue a challenge request 220 (communication 3B). For example, C.D.O. stub 214 might be code that generates and transmits challenge request 220, or it might be a web page that is displayed by user device 202, perhaps with a message like "Click on this line to get validated before you can access the requested resource" with the link directed to authentication challenge system 206. In response to receiving challenge request 220, authentication challenge system 206 might respond (communication 4B) with a challenge data object (C.D.O.) 222, example structures of which are detailed herein elsewhere.

C.D.O. 222 might include code, a web page, or some combination that can be processed by user device 202 to present a challenge to a user of user device 202. Authentication challenge system 206 might then await a response from user device 202, typically while handling other activities asynchronously. User device 202 might send a challenge response 224 (communication 5B) to authentication challenge system 206. As explained elsewhere herein, authentication challenge system 206 can process challenge response 224 in light of C.D.O. 222 and evaluate whether the user satisfied the challenge represented in C.D.O. 222 and then engage in a negotiation (explained in more detail below) with user device 202 (communication 6B).

If authentication challenge system 206 determines that the challenge was met, communication 6B (negotiation 326) can be in the form of a "pass" message, while if authentication challenge system 206 determines that the challenge was not met, communication 6B can be in the form of a "fail" message. Another alternative is a message indicating that the user has additional chances to try again, perhaps with a new challenge included with such alternative message (e.g., "Your answer did not seem right, given the challenge. Click here to try again.").

Challenge response 224 and/or challenge request 220 might include information from value server 204 that passed through user device 202, perhaps in a secured form. That information might allow authentication challenge system 206 to identify the user and a user session for which the challenge is to apply. Authentication challenge system 206 might then store a user session token in user session token storage 228 indicating the results of the challenge. Then, when value server 204 sends a token request 230 identifying the user and user session, authentication challenge system 206 can reply with a token response 232 indicating whether the user met the challenge, and possibly also that the user did not meet the challenge or that the user never requested a challenge or responded to one.

C.D.O. stub 214 might be such that the user needs to send a request for authenticated service to value server 204, such as a webpage portion that instructs "Once you are authenticated, click here to proceed to your desired content" or the like in the form of a request for authenticated service 240 (communication 7B), which can signal to value server 204 that the user is asserting that they have completed the challenge. Of course, value server 204 need not trust the assertion, but is then aware that authentication challenge system 206 might indicate that the challenge was indeed correctly responded to. Request for authenticated service 240 might be sent by user device 202 without user interaction after user device 202 receives a success message related to negotiation 226.

At this point, value server 204 can send token request 230 to authentication challenge system 206 and receive token response 232 from authentication challenge system 206. In some embodiments, value server 204 might wait a predetermined time period and send token request 230 without waiting for a signal from user device 202. In such embodiments, user device 202 might not send a request for authenticated service after its initial request. In some embodiments, authentication challenge system 206 might delay sending token response 232 if authentication challenge system 206 is involved in processing a challenge with user device 202 such as when the user has not yet requested a challenge or has failed a challenge but is given another chance, so that authentication challenge system 206 can ultimately send a token response indicating a successful response to the challenge.

In any case, value server 204 might respond with data 242 responsive to the user request. If authentication challenge system 206 can independently determine that user device 202 is operated by an encouraged user, then authentication challenge system 206 might store a user session token in user session token storage 228 indicating that a challenge was met. In that case, the timing of receiving token request 230 is less important, as authentication challenge system 206 would be ready to respond at any time.

A number of examples of challenges are described in detail herein, including possible user responses that could be conveyed in challenge response messages. While just one challenge process was described in detail, it should be understood that value server 204 might process many requests in parallel and interact with more than one authentication challenge system and authentication challenge system 206 might process requests from many user devices in parallel and interact with many value servers.

Challenge response message 224 might include, in addition to an indication of the user's response to the challenge, a challenge identifier that identifies C.D.O. 222 that was sent to challenge the user, in which case authentication challenge system 206 can easily match up the response with the challenge to determine if the response is consistent with an answer key for the specific challenge given.

Once value server 204 receives token response 232 and token response 232 indicates that the user is authenticated and not an undesired access, value server 204 can determine its next step. Value server 204 might also store token response 232 into a session token store 252 usable for handling subsequent requests from the user. At this point in the process, whether value server 204 determined that no challenge was needed (2A) or determined a challenge was needed and has a token response indicating that the challenge was met, value server 204 can respond to the user's request.

In a typical process, all of the processing might be done in a time period similar to a time period normally required for processing service requests. In other words, it could appear to the user that the processing is quick, except for the time the user takes to mentally process and respond to the challenge presented. As explained herein below, C.D.O.s might be created in advance for quick deployment.

Authentication Controller Variation

In the example shown in FIG. 2, a value server is configured to handle some of the authentication processes. Another variation could be used where the value server does not handle any authentication and might not even be aware it is happening. This might be useful for securing legacy systems.

Figure 3:
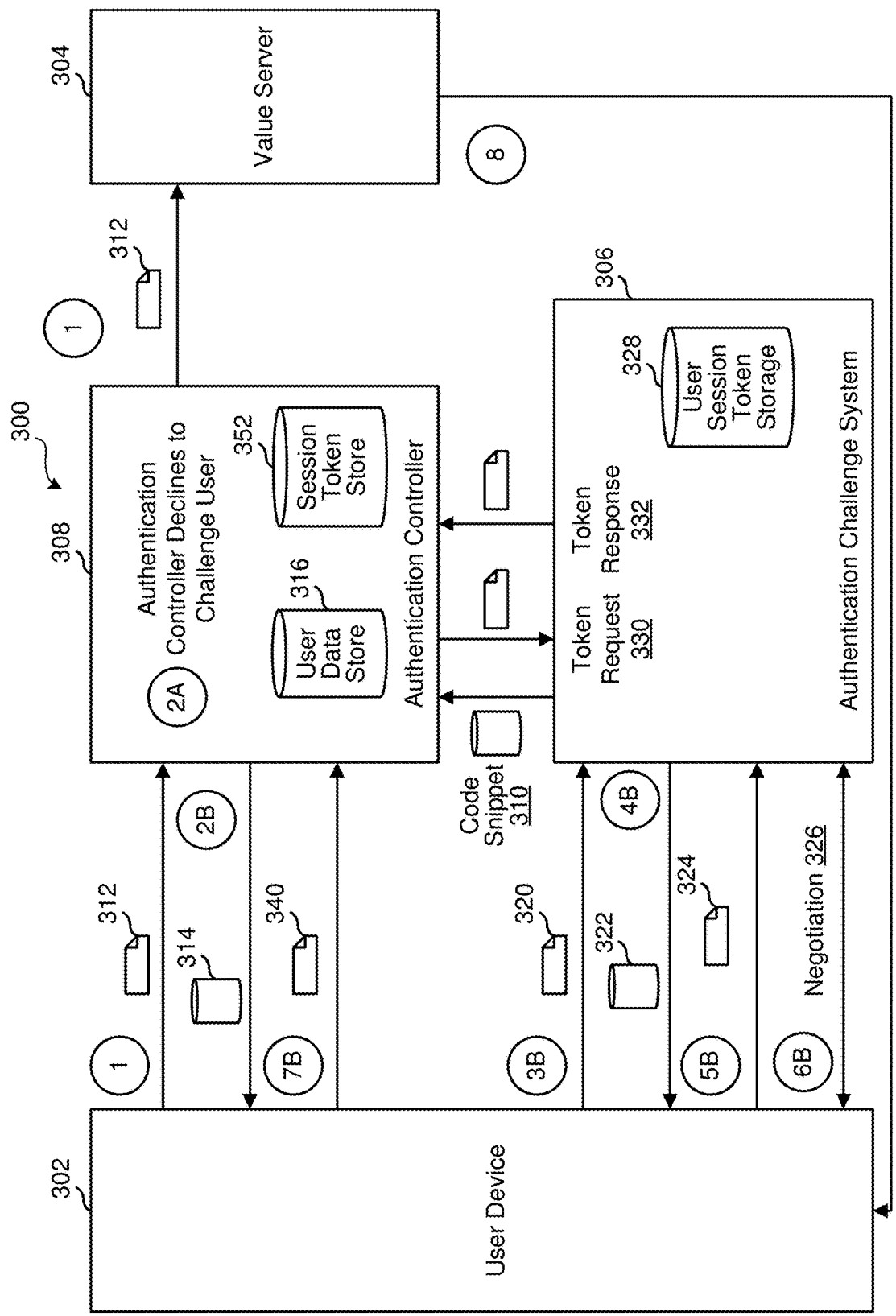
FIG. 3 is a block diagram of a system in which a value server is secured using an authentication controller for access control.

FIG. 3 is a block diagram of a system 300 in which a value server 304 is secured using an authentication controller for access control such that requests from a user device 302 can be limited, mostly, to requests from authorized users. As shown there, an authentication challenge system 306 and an authentication controller 308 together operate to control access of user device 302 to value server 304. As illustrated, a communication 1 comprises a request for services 312 from user device 302 to authentication controller 308 and might be a request similar to other requests described herein.

Also illustrated in FIG. 3 are indicators of a typical order of steps of communications among user device 302, value server 304, authentication challenge system 306, and authentication controller 308. It should be noted that other orders of steps might be taken, and some steps might be omitted or added. In a precursor step, authentication challenge system 306 might supply authentication controller 308 a code snippet 310 usable by authentication controller 308 for handling challenges. In some embodiments, authentication challenge system 306 and authentication controller 308 are integrated.

In an operational process illustrated, user device 302 sends a "request for service" message 312 towards value server 304 (communication 1), which is either intercepted by authentication controller 308 or passed through to value server 304. As with value server 204 of FIG. 2, authentication controller 308 determines whether a challenge is needed and either declines to challenge the user making the request (communication 2A) or to challenge the user making the request, possibly relying on user data in a user data store 316.

In the case where authentication controller 308 decides to challenge, authentication controller 308 sends a challenge data object (C.D.O.) stub 314 to user device 302 (communication 2B). C.D.O. stub 314 might be code, a web page, or some combination that is designed to have user device 302 issue a challenge request 320 (communication 3B) to authentication challenge system 306, similar to C.D.O. stub 214 shown in FIG. 2. In response to receiving challenge request 320, authentication challenge system 306 might respond (communication 4B) with a challenge data object (C.D.O.) 322, similar to C.D.O. 222 of FIG. 2. Authentication challenge system 306 might then await a response from user device 302, typically while handling other activities asynchronously. User device 302 might send a challenge response 324 (communication 5B) to authentication challenge system 306. Authentication challenge system 306 can process challenge response 324 in light of C.D.O. 322 and evaluate whether the user satisfied the challenge represented in C.D.O. 322 and then engage in a negotiation with user device 302 (communication 6B).

If authentication challenge system 306 determines that the challenge was met, communication 6B (negotiation 326) can be in the form of a "pass" message, while if authentication challenge system 306 determines that the challenge was not met, communication 6B can be in the form of a "fail" message. Another alternative is a message indicating that the user has additional chances to try again, perhaps with a new challenge included with such alternative message.

Challenge response 324 and/or challenge request 320 might include information from authentication controller 308 that passed through user device 302, perhaps in a secured form. That information might allow authentication challenge system 306 to identify the user and a user session for which the challenge is to apply. Authentication challenge system 306 might then store a user session token in user session token storage 328 indicating the results of the challenge. Then, when authentication controller 308 sends a token request 330 identifying the user and user session, authentication challenge system 306 can reply with a token response 332 indicating whether the user met the challenge, and possibly also that the user did not meet the challenge or that the user never requested a challenge or responded to one. Authentication challenge system 306 and/or authentication controller 308 might have logic to delay token request 330 and/or token response 332 to give the user time to complete a challenge but can send token request 330 after receiving a request for authenticated service 340 (communication 7B). For example, authentication challenge system 306 might wait ten seconds after receiving token request 330 before responding with token response 332 if the user has not yet requested a challenge or has failed a challenge but is given another chance. Authentication controller 308 might have logic to delay sending token request 330 to give the user some time to complete a challenge process with authentication challenge system 306.

If authentication challenge system 306 can independently determine that user device 302 is operated by an encouraged user, then authentication challenge system 306 might store a user session token in user session token storage 328 indicating that a challenge was met. While just one challenge process was described in detail, it should be understood that authentication controller 308 might process many requests in parallel and interact with more than one authentication challenge system and more than one value server and authentication challenge system 306 might process requests from many user devices in parallel and interact with many authentication controllers.

Challenge response message 324 might include, in addition to an indication of the user's response to the challenge, a challenge identifier that identifies C.D.O. 322 that was sent to challenge the user, in which case authentication challenge system 306 can easily match up the response with the challenge to determine if the response is consistent with an answer key for the specific challenge given.

Once authentication controller 308 receives token response 332 and token response 332 indicates that the user is authenticated and not an undesired access, authentication controller 308 can determine its next step. Authentication controller 308 might also store token response 332 into a session token store 352 usable for handling subsequent requests from the user. At this point in the process, whether authentication controller 308 determined that no challenge was needed (2A) or determined a challenge was needed and has a token response indicating that the challenge was met, authentication controller 308 can forward the user's request to value server 304, which might respond (communication 8) to user device 302 as if no authentication took place.

As with embodiments where a value server handles some of the tasks, all of the processing might be done in a time period similar to a time period normally required for processing service requests and C.D.O.s might be created in advance for quick deployment. In some of these steps and examples, the communication and/or message or data sent corresponds to what is depicted in FIG. 2 and described herein.

Authentication Challenge System Example

An authentication challenge system might have multiple components, such as a decision server that decides whether a user device should be challenged, a response processor that evaluates user responses to challenges, a challenge server that outputs and manages challenges, a challenge creation system usable for creating challenges and classes of challenges, and an authentication access system that controls whether the user device obtains access to the value server. Some of these components might be integrated into a single system, such as where the challenge processor and decision server are integrated, the challenge processor and response processor are integrated, or all three are integrated.

Figure 4:
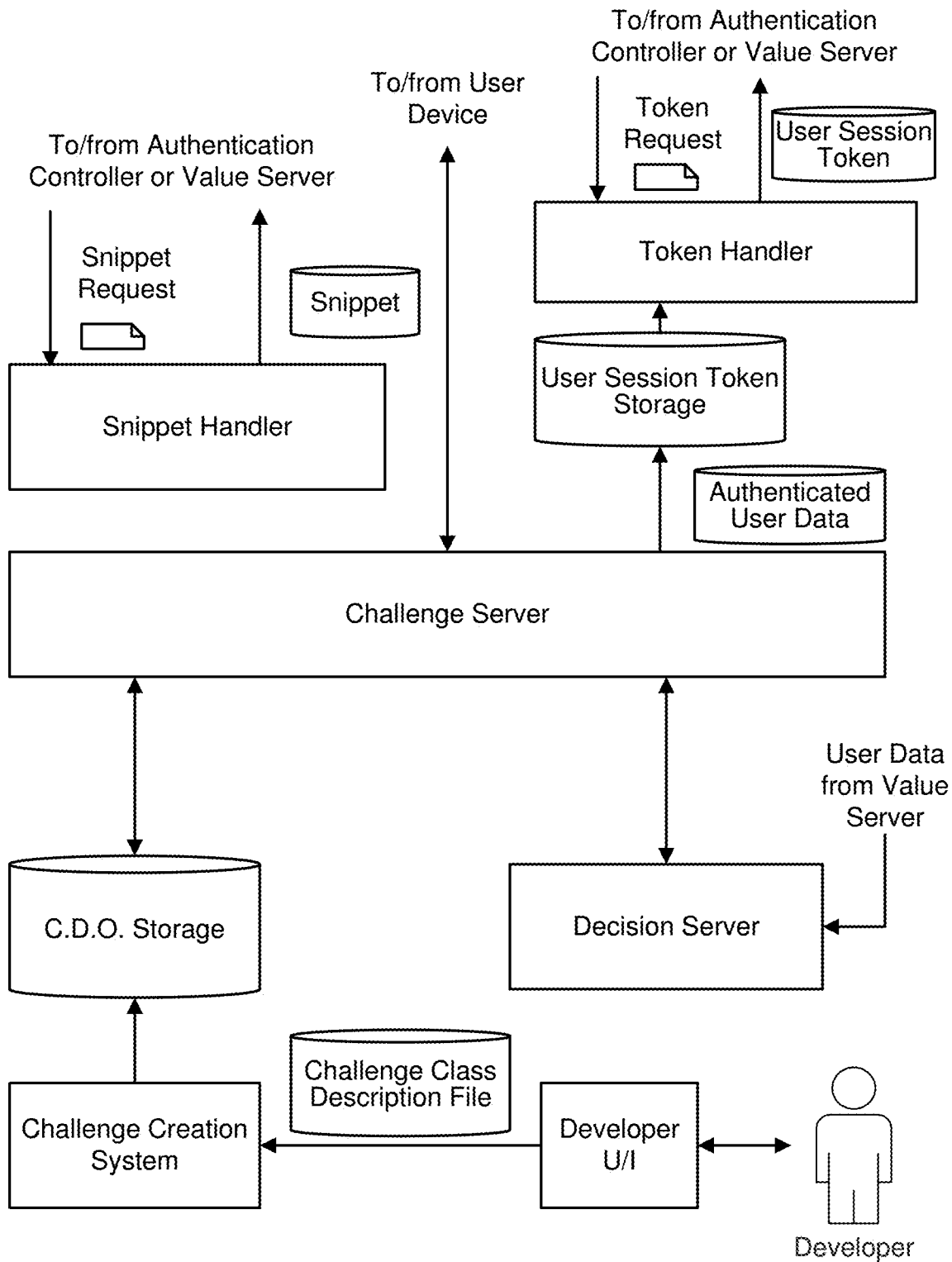
FIG. 4 is a block diagram of an authentication challenge system in an embodiment.

FIG. 4 is a block diagram of an authentication challenge system in an embodiment. As illustrated there, an authentication challenge system might include a snippet handler that receives a snippet request from a value server or an authentication controller and responds with a code snippet, such as code snippets 210 and 310 (in FIGS. 2-3). A challenge server might receive and respond to messages from a user device (as detailed in FIG. 5). A token handler might receive token requests from a value server or an authentication controller and respond with a token response, as in FIGS. 2-3, in response to data read from a user session token storage. The challenge server might provide user session data for the user session token storage.

As shown, the challenge server might interact with a decision server that decides whether to challenge a user, perhaps based in part on user data received from a value server or an authentication controller. The challenge server might interact with a C.D.O. storage to retrieve C.D.O.s to provide to user devices. The C.D.O. storage might be pre-populated with C.D.O.s for quick response. Those C.D.O.s might be created in advance by a challenge creation system. A developer might develop classes of challenges using a developer user interface to create challenge class description files that the challenge creation system can use to generate large numbers of distinct C.D.O.s. By being able to create large numbers of distinct C.D.O.s from one challenge class description file, the labor effort per C.D.O. can be reduced, allowing for many more distinct challenges (which might be more work for bypassers to try and work around) without requiring much more work on the part of developers.

Figure 5:
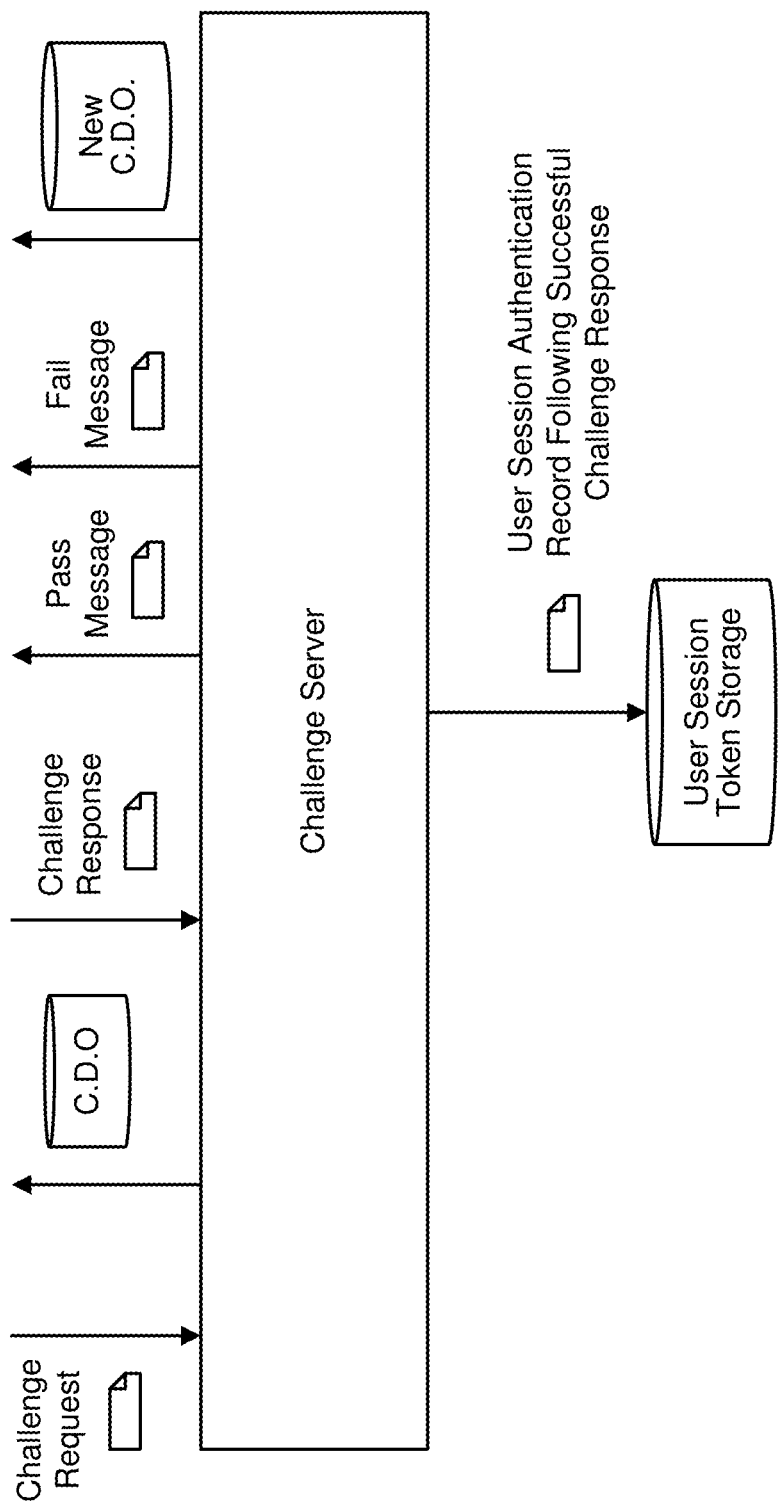
FIG. 5 is a block diagram showing user interactions with the challenge server, in an embodiment.

FIG. 5 is a block diagram showing user interactions with the challenge server, in an embodiment. As shown there, a user device might send a challenge request to the challenge server, which might respond with a C.D.O. The user device might send a challenge response, perhaps formatted so that the challenge server can determine the corresponding C.D.O. or at least whether the challenge response is a valid response. The challenge server might then send the user device a "pass" message, a "fail" message, or a new C.D.O. giving the user a chance to respond to a new challenge. Where the user device provides a valid and correct challenge response, the challenge server might then store a user session authentication record into a user session token storage.

Figure 6:
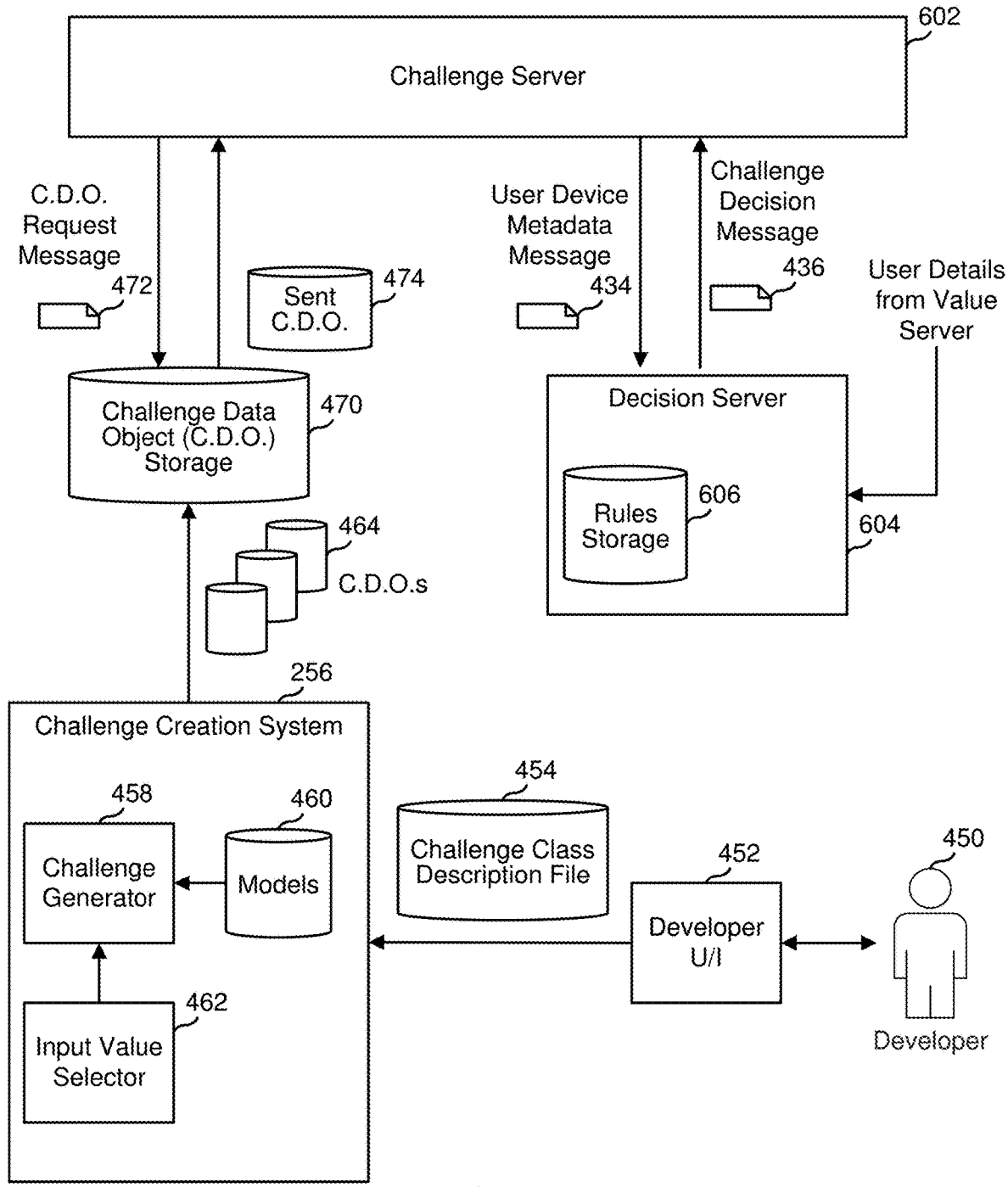
FIG. 6 illustrates internal operations of an authentication challenge system in greater detail, in an embodiment, considering FIGS. 4-5 in context.

FIG. 6 illustrates internal operations of an authentication challenge system in greater detail, in an embodiment, considering FIGS. 4-5 in context. As shown there, a developer 450 might use a developer user interface 452 to generate a challenge class description file 454 and provide that to a challenge creation system 256, which might comprise a challenge generator 458 that receives input value selections from an input value selector 462 and models from a model store 460. With this approach, challenge creation system 256 can generate a large number of C.D.O.s 464 from challenge class description file 454 and those can be stored into a C.D.O. storage 470.

A challenge server 602 might send a C.D.O. request message 472 to C.D.O. storage 470, perhaps in response to a user's challenge request. C.D.O. storage 470 might reply to challenge server 602 with a C.D.O. 474. Challenge server 602 might send a user device metadata message 434 to a decision server 604 and get back a challenge decision message 436 indicating whether a user should be challenged. A decision by decision server 604 might be based on rules stored in a rules storage 606, which might be rules as described herein elsewhere, and/or based on user data from a value server and/or an authentication controller.

Examples of Operations

Attempts to access the protected computer resource might be made by various users. Typically, the operator of the computer resource might want to allow legitimate users to access the computer resource, while blocking bypassers (users who might be attempting to access the computer resource in ways undesired or unintended by the operator, such as being employed to bypass legitimate controls, and/or masquerade as genuinely interested customers) and automated users, such as bots (automated processes that might be attempting to access the computer resource in ways undesired or unintended by the operator). In such cases, the operator might set up the computer resource on a value server and have access to that value server controlled by an authentication access system of an authentication challenge system.

An authentication access system might serve as a gatekeeper to a computer resource protected by the authentication challenge system and/or might provide a recommendation or result to another system that controls the computer resource. Thus, the authentication access system might block what is determined to be an access by an unintended user and allow what is determined to be an access by a legitimate user or might just provide messaging to other systems that might result in such access controls.

Protection of computer resources might comprise giving legitimate users easy access the computer resource while blocking unintended users (e.g., bypassers and bots) or at least making access more difficult for unintended users. The computer resource might be a server providing content (e.g., a web server serving web pages), an e-commerce server, an advertising-supported resource, a polling server, an authentication server, or other computer resource. The computer resource might be data, communications channels, computing processor time, etc. In part, a role of the authentication challenge system is to try and determine what kind of user is attempting an access and selectively put up roadblocks or impediments for unintended users.

A value server might provide computer resources, or access thereto, to a user having a user device. The user device might be a computer device the user uses to connect to the value server. The value server can issue to the user device a demand for the user to successfully complete a challenge before the value server issues to the user the service of value. In some embodiments, the value server sends the user device a message indicating that the user device should contact an authentication challenge system, obtain an access token (which the authentication challenge system would presumably only supply if it deemed the user successful in a challenge), and provide the access token to the value server in order to access desired assets.

The nature of the user device might not be apparent to the value server or other components of the authentication challenge system, but those components might be configured as if the user device is a user device that can be operated by an automated process or by a human process. For example, responses to challenges might be received that could have been generated by an automated process or by a human.

A decision server determines whether a user system needs to be challenged and, if so, what class, level, and/or type of challenge to use. The decision server might respond to a request from a value server or a request from a user system, perhaps where the user system is sending the request to the decision server at the prompting of the value server. The value server might send the decision server a set of user properties that might be known to the value server but not necessarily knowable by the decision server. Examples might include a user's history of activity with the value server, transactions the user made on the value server, etc. For example, the value server might indicate to the decision server that certain users are suspicious based on past interactions with the value server and the decision server might use this information to lean towards issuing a challenge, whereas in the value server indicates that a user has behaved normally in the past and is a regular, known user, the decision server might use this information to lean away from issuing a challenge. The decision server can evaluate the user details that the value server provides, along with its own information, and compute a decision. The decision server might also have access to other data about the user or user's device, such as past history from other sources, user properties, a device fingerprint of the user's device, etc. The decision server might determine that the user's device had attempted to automatically solve previous challenges, and therefore decide to issue a challenge that is especially hard to automate. The decision server might decide that no challenge is necessary, that some challenge is necessary, and if necessary, what class, level, and/or type of challenge is warranted. The decision server might store the user properties and details of a present decision, which can be used for making future challenge decisions.

In some embodiments, instead of the value server passing data about the user directly to the decision server, the value server may pass the data via the user device, perhaps in an encrypted form, with the user device forwarding that data to the decision server. If the decision server can decrypt it, but the user device cannot, that allows for secure transmission of that data from the value server to the decision server. Presumably, that would make it difficult for the user device to create a false set of data. In some embodiments where the data passes through the user device, the user device might be directed to pass data back to the decision server if the user device is to obtain access to the value server. Alternatively, the value server and the decision server might communicate directly. There are various ways the decision server could be alerted to some bypass attempts, in which case the decision server might determine that it is to issue a new challenge, perhaps under the suspicion that the user device has tampered with the data.

The decision server can send a decision message indicating the decision and details to the value server and/or the user device. In the latter case, the decision message might include an identifier that the user device can pass on to the value server. In a specific embodiment, a value server instructs the user device to make a request to the decision server, the user device makes the request of the decision server, the decision server decides not to issue a challenge and provides the user device with a token that the value server will accept for providing access to the controlled asset, or the decision server decides to issue a challenge and after the user device successfully meets the challenge, a component of the authentication challenge system (the decision server or other component) provides the user device with the token that the value server will accept for providing access to the controlled asset.

A response processor receives challenge details of a challenge and a user response to a challenge and determines whether the challenge is met. In some embodiments, the challenge is deemed met if the user device provided an answer to a challenge query that matches a pre-stored answer to that challenge. The response processor might receive a challenge evaluation data object from another component, where the challenge evaluation data object includes details of the challenge and the user response and reply with a binary answer to whether the response is deemed correct. The reply of the response processor might be to the decision server, which can then store information for future challenges, might be to the user device with a token that the value server would accept, or other options that convey results of a user response evaluation. In some instances, the response processor might provide a reply that is inconsistent with what actually occurred, such as deeming that an automated process is actually a human or that a human authorized user is actually an unauthorized user. However, with a well-designed response processor and other components, such incidents might be infrequent. In some instances, the response processor might initially deem a response to be correct enough to allow for access but might indicate that the user is questionable and that might trigger the decision server to issued additional challenges. This might be useful in the case where a human in a sweatshop can get the response correct, but still be judged as undesired, and therefore get flagged for more challenges that burn more time in order to render those activities less profitable. In some cases, the response might be correct, but have indicia of automation, such as a response being so quick that it might be from an automated source. In this manner, the decision server can take various factors into play to determine whether to issue a challenge, while the response processor simply outputs a binary decision to allow access or block access. In other variations, the response processor can output a decision that has more than two possibilities. In a specific example, the response processor has three possible responses to a received challenge evaluation data object: "allow the user access to the value server", "deny the user access to the value server", and "issue another challenge."

A challenge server outputs and manages challenges, perhaps in the form of challenge data objects. The challenge server might send a challenge data object to a decision server and/or to a user device directly. A challenge data object might have elements that are known to the authentication challenge system but are not conveyed to the user device, such as details used to construct the challenge represented in the challenge data object that might be stored as a set of pre-determined human expectations generated based on a model used to construct the challenge.

A challenge processor, perhaps part of the decision server and/or the response processor, can evaluate details, metadata, etc. of a user response, and assess future risks of interactions with that user, which can then be forwarded to the decision server to help with future decisions about whether to challenge the user.

An authentication access system might be used to control access to the value server, such as in cases where the value server is not configured to request and evaluate tokens from users or user interactions. In such cases, the authentication access system can handle those tasks and interact with the decision server, the response processor, and/or the challenge processor. In a specific implementation, user devices and user computer systems of those user devices can only access the value server via the authentication access system and the value server allows for access from any system that the authentication access system allows through. The authentication access system can then be the gatekeeper of the value server.

Figure 7:
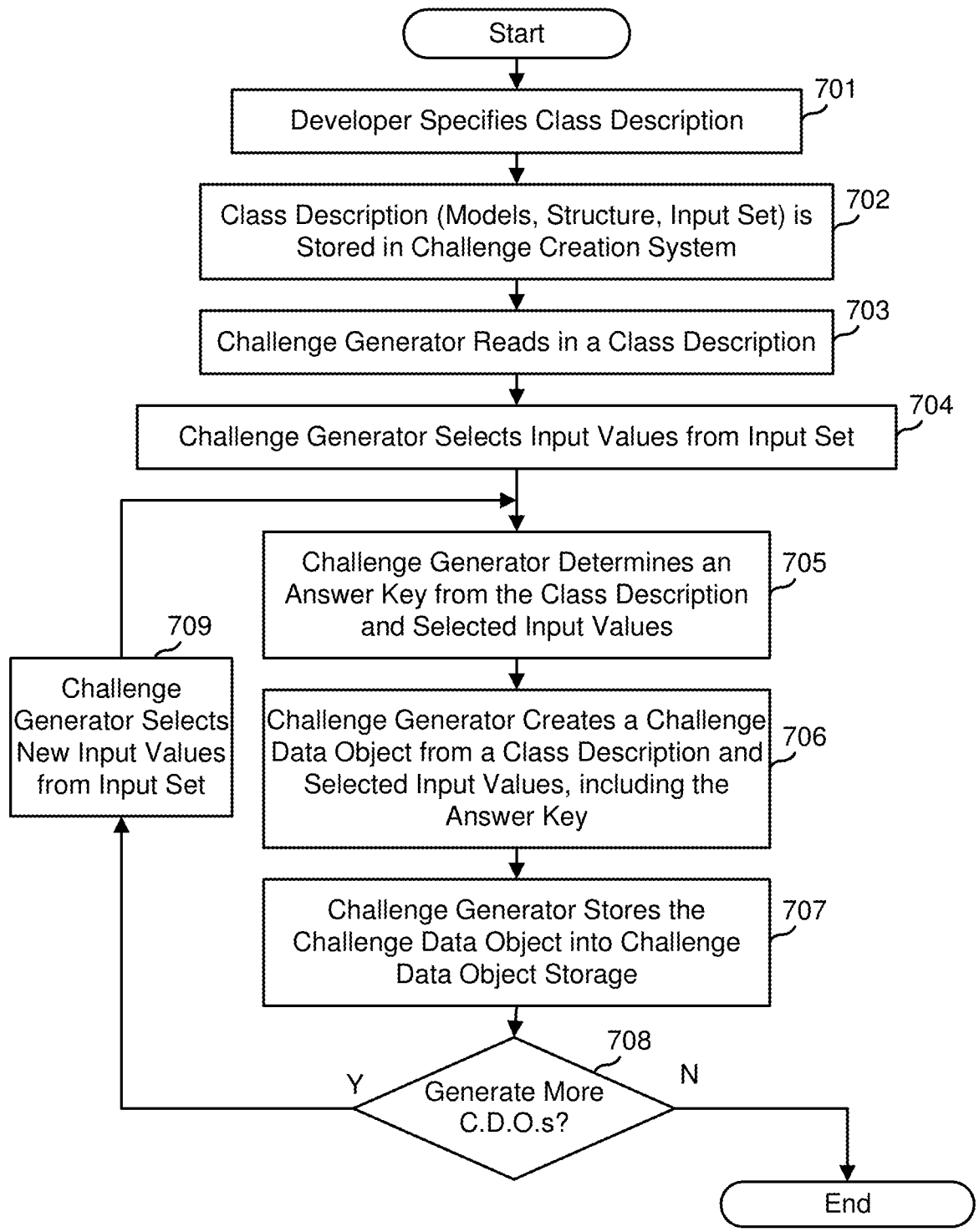
FIG. 7 is a flowchart depicting creation of a class of authentication challenges, according to an embodiment.

FIG. 7 is a flowchart depicting creation of a class of authentication challenges, according to an embodiment. In a method illustrated there, at step 701, a developer might specify a class description. At step 702, a class description (models, structure, input set) is stored in a challenge creation system. At step 703, a challenge generator reads in a class description, and at step 704, the challenge generator selects input values from input set. At step 705, the challenge generator determines an answer key from the class description and the selected input values. At step 706, the challenge generator creates a challenge data object from a class description and selected input values, including the answer key. At step 707, the challenge generator stores the challenge data object into a challenge data object storage. At step 708, the challenge generator determines whether to generate more C.D.O.s. If so, at step 709, the challenge generator selects new input values from an input set and loops back to step 705. If not, the process terminates or proceeds to another class description.

Figure 8:
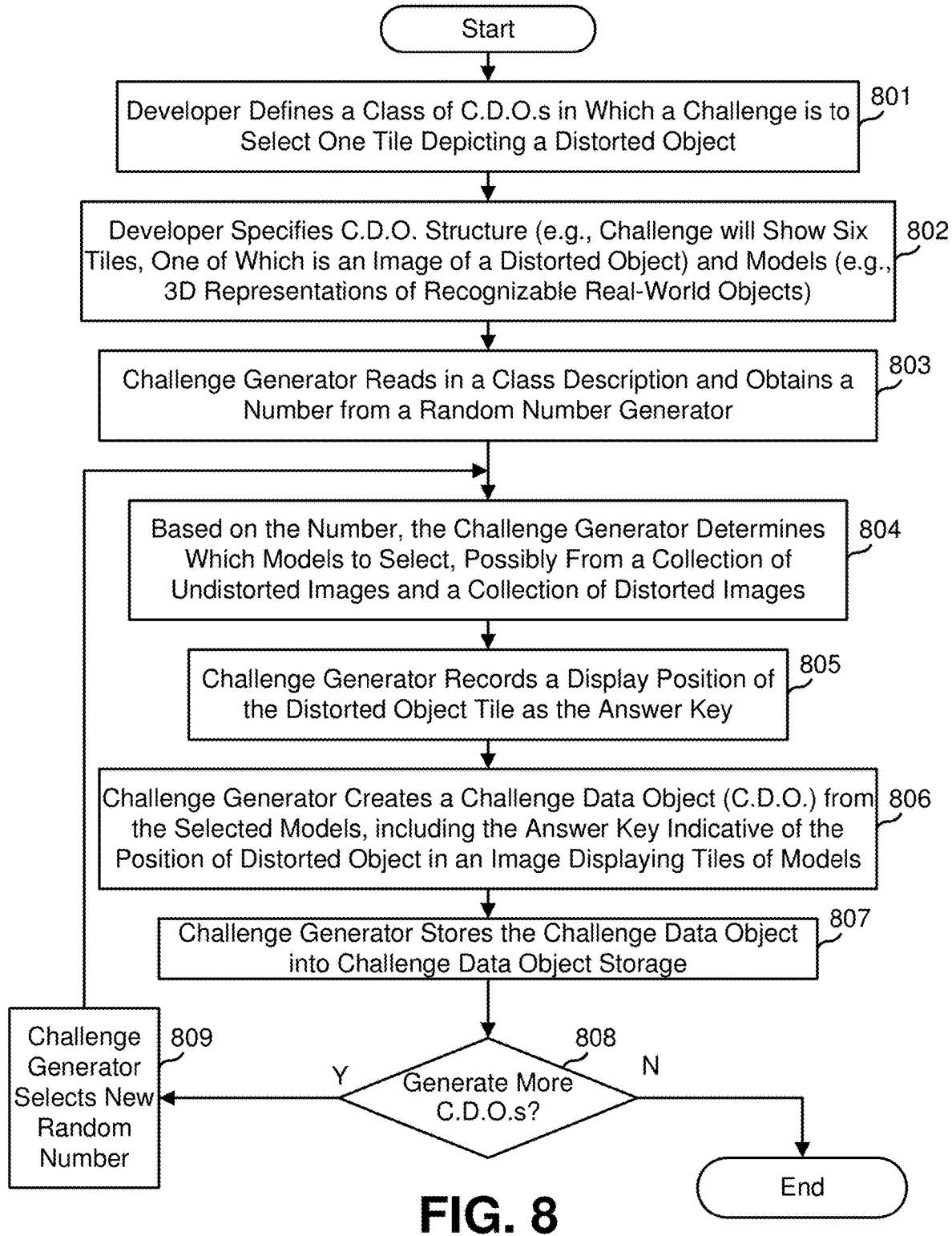
FIG. 8 is a flowchart depicting creation of a specific class of authentication challenges, according to an embodiment.

FIG. 8 is a flowchart depicting creation of a specific class of authentication challenges, according to an embodiment. In a method illustrated there, at step 801, a developer defines a class of C.D.O.s in which a challenge is to select one tile depicting a distorted object. At step 802, the developer specifies a C.D.O. structure (e.g., challenge will show six tiles, one of which is an image of a distorted object) and models (e.g., 3D representations of recognizable real-world objects). At step 803, a challenge generator reads in a class description and obtains a number from a random number generator or other input. At step 804, based on the number, the challenge generator determines which models to select, possibly from a collection of undistorted images and a collection of distorted images. At step 805, the challenge generator records a display position of the distorted object tile as the answer key. At step 806, the challenge generator creates a challenge data object (C.D.O.) from the selected models, including the answer key indicative of the position of distorted object in an image displaying tiles of models. At step 807, the challenge generator stores the challenge data object into a challenge data object storage. At step 808, the challenge generator determines whether to generate more C.D.O.s. If so, at step 809, the challenge generator selects new input values from an input set and loops back to step 804. If not, the process terminates or proceeds to other tasks.

As explained above, based on the number, the challenge generator determines which images to select to display as tiles, but other approaches could be used. It may be that one of the images is selected from a collection of distorted objects and the remaining images are selected from a collection of non-undistorted objects, or all the objects are undistorted at first and one is distorted. Thus, stored images used in tiles might be 2D renders of a model, some of which renders are of distorted objects and some of which are of non-distorted objects.

In a particular embodiment, models correspond to tiles and images that form part of presentations are concatenations of tiles. In some embodiments, where the boundaries of tiles are clear (e.g., "of the ten images shown, which one is distorted") but in other challenges, the options are not presented as clearly delineated tiles to the user devices, but might be a singular scene built of multiple objects where the boundaries are known only to the authentication server. Thus, in some embodiments, the challenge data object data that the user device receives might not have a clear indication of boundaries and that might be left to the user to discern, as needed, making automated processing harder.

An Authentication Challenge

An authentication challenge, according to an embodiment, might proceed as described herein using the generated C.D.O.s. A challenge might involve a user forming a mental image from a two-dimensional (2D) rendering of a three-dimensional (3D) virtual object with simulated real-world properties. As another example, the user might be presented with two sequences of images (baby, child, teen, adult, senior adult) and (teen, adult, baby, child, senior adult) and be asked to indicate which sequence is in logical order. As yet another example, the user might be asked about properties of a virtual object in an image (e.g., "Is the shadow correct?", "Which of these shows a person relaxing?", etc.) where the properties are something a human could easily recognize and an automated process might not be able to process correctly.

In a specific implementation, an authentication system renders a three-dimensional (3D) virtual scene to form a two-dimensional (2D) image that is presented to the user, with the expectation that an authorizer user can form, from the 2D image, a mental 3D model consistent with the original virtual scene and therefore correctly answer questions about that 3D virtual scene without needing access to the 3D virtual scene data. In a more general case, the authentication system converts visual or other sensed inputs to a form that eliminates some of the information and presents the user with that modified form, wherein an authorized human user would mentally fill in the eliminated information from real-world knowledge and therefore be able to answer questions about what is observed in the modified form.

Figure 9:
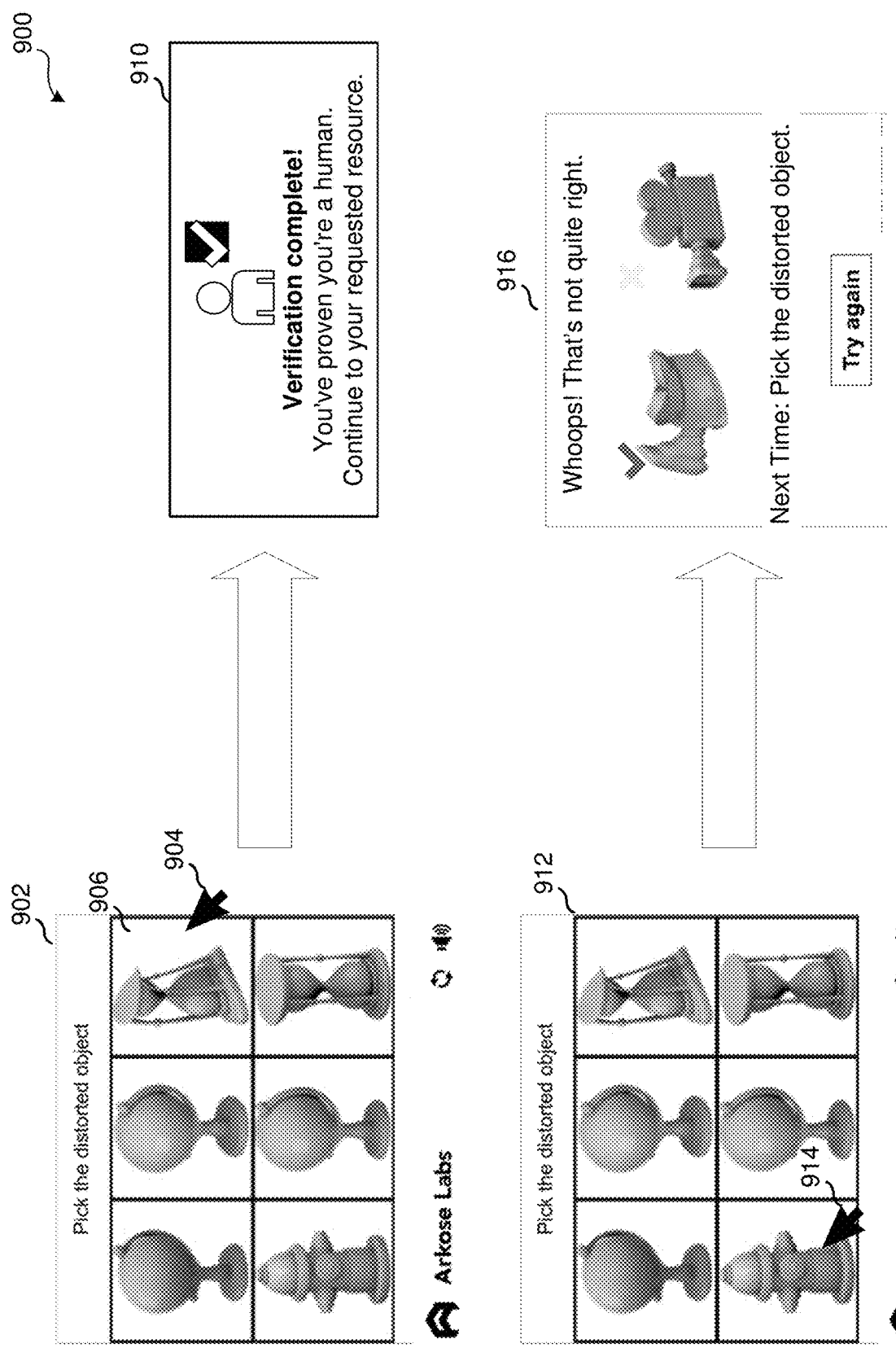
FIG. 9 depicts an example of an operation of checking user responses, according to an embodiment.

FIG. 9 depicts an example of an operation of checking user responses. A challenge creation system might be used to create challenges that are to be presented to users. The challenge creation system might include a 3D modelling system that performs tasks that enable a challenge creator to create, manipulate, and render virtual objects in creating the challenges. A challenge might be stored electronically as a data object having structure, such as program code, images, parameters for their use, etc. The challenge server might be provided a set of these data structures and serve them up as requested.

In the illustration of FIG. 9, a challenge presentation might be in the form of challenge image 902, which the user is expected to move their pointer 904 to the upper right tile 906, as that is the tile depicting a distorted hourglass. A response to that selection might be the success message 910. On the other hand, if the user is presented with a challenge presentation in the form of challenge image 912, and the user points to and selects a tile 914 of a nondistorted object, the user might receive a fail message 916 and be allowed to try again.

In some embodiments, the challenge creation system can create a large number of different challenges from small variations. By being able to create a large number of distinct challenges from a single class, the ratio of effort by challenge creators and users can be kept low. Ideally, the variations of the challenges are not such that a computer process can easily process any one of those to guess the correct human expectation of the challenge.

A challenge creator, such as a 3D artist, puzzle maker, or other challenge creator, might use a modelling program to create one or more virtual objects and give each one various visual properties, for example shape, texture, and animation routine. A challenge creator might give each virtual object some simulated physical properties, for example flexibility, bounciness, transparency, weight, and friction. The challenge creator can then use the modelling program to create a virtual scene in which various virtual objects can be placed and manipulated.

Each object, in keeping with its physical properties, might fall, move, collide, bend, and slide in the scene in a way similar to how a real object would behave in a real space following real laws of physics, which are such that a human might readily recognize are correct or incorrect. The objects might be placed in arbitrary positions and orientations within constraints specified by the challenge creator. The objects then obey the simulated rules of physics so that they move through the scene and thereby become oriented in arbitrary positions and configurations over time.

The challenge creator can use the modelling program to create a virtual camera that surveys the virtual scene. The camera might be in an arbitrary position and aimed in an arbitrary direction, within constraints specified by the challenge creator.

The challenge creator can use the modelling program to create virtual lights that light up the virtual scene and the virtual objects within it, producing shades of colour and texture, shadows, highlights, and reflections. The lights might be in arbitrary positions and aimed in an arbitrary direction, perhaps within constraints specified by the challenge creator.

The challenge creator can direct the modelling program to render a series of images (2D or otherwise) that are captured by the virtual camera, showing the virtual objects in the virtual scene lit by the virtual lights. The images can represent a sequence over time, so that as the objects move, each image shows the objects in a different position. This rendering process produces an animated image sequence comprising one or more frames, each frame rendered in sequence over time. The modelling program can also produce a list of properties that the virtual objects have. The list might include the property of correctness, this being whether the image was produced from a set of virtual objects that either do or do not serve as a correct answer to a question that demands whether the objects satisfy a specific criterion. If the virtual objects satisfy the criterion, the image is associated with a property of "correct". If the virtual objects do not satisfy the criterion, the image is associated with a property of "incorrect". The modelling program stores and associates the image and the list of properties of the virtual objects in the scene, including the property of correctness, possibly in the form of an answer key that a computer process can compare to user responses to prompts presented to the user. As an example, if the image is of a tree but it casts a shadow of a vase, the image might have the property of "incorrect." As images are stored as part of a data structure representing a challenge, one data element might be the images' correctness property.

Figure 10:
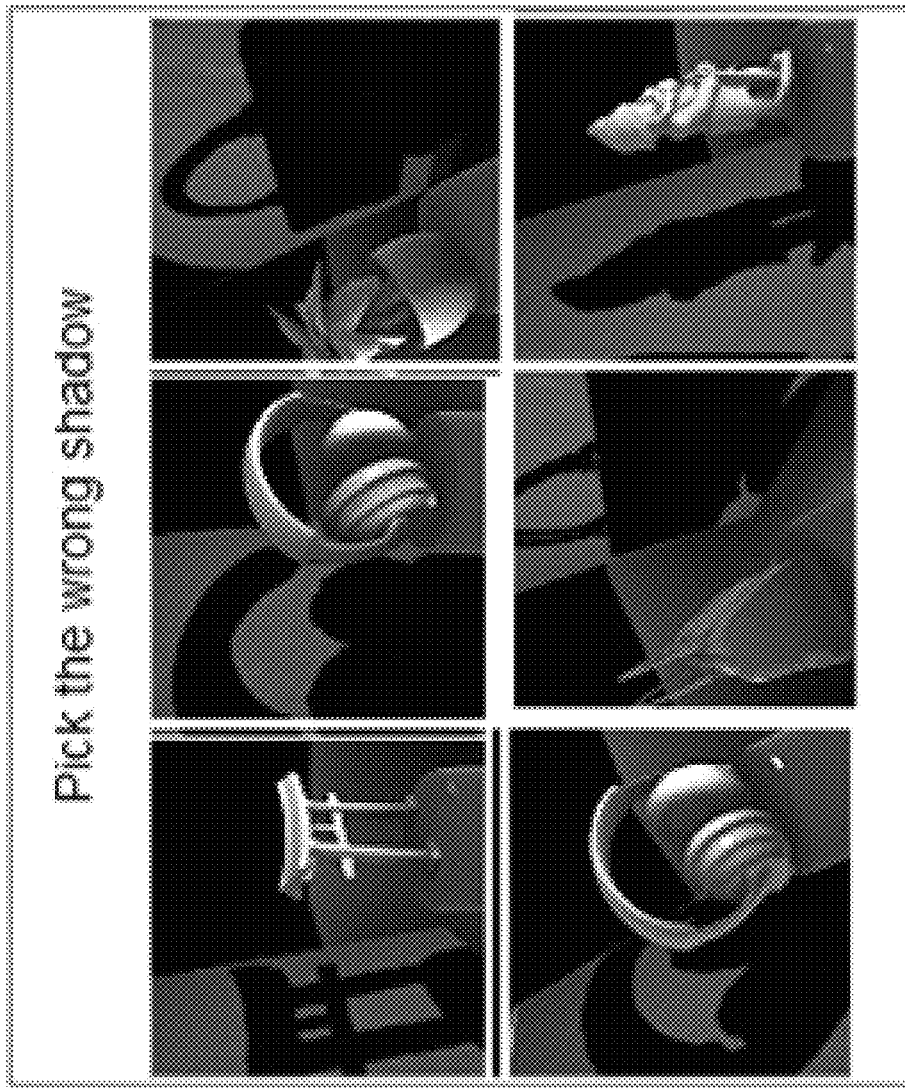
FIG. 10 depicts a presentation for a challenge to select a tile with a mismatched shadow, according to an embodiment.

FIG. 10 depicts a presentation 1000 for such a challenge. The criterion is that the shadow does not match with the depicted object and lighting. The prompt is "Pick the wrong shadow" and the answer key is that the upper right image is the one that meets the criterion.

The challenge creation system might be integrated with the challenge server or be distinct therefrom and the challenge creation system might be integrated with the response processor or be distinct therefrom.

The challenge server can perform challenge management and distribution. The modelling program might send a challenge data object, including images, to the challenge server with an associated list of properties, some of which are provided to challenged users and some which are not. The challenge server can then store the image and the list of properties and other challenge data elements as a unit, maintaining their association. This process can be repeated multiple times so as a result the challenge server has a set of images, with each image associated with a list of properties and possibly other challenges. The images might be in a time sequence, such as infant/teenager/adult/senior or shiny new car/spinout/crumpled car, etc. or might have no apparent time relationship.

A challenge data object might include various components, such as images, indications of an order of presentation of the images, a correctness property indicative of whether the images are consistent with what would be expected in a real-world situation or not, timing parameters, origin, uses, expected user responses, correct responses, incorrect responses, response time, response variance tolerances, etc. and other data components as might be packaged in the challenge data object. The challenge data object might also include parameters and values to indicate the conditions under which the challenge data object might be used, such as what types of user devices it might be used on, how it might be presented, etc.

A challenge might comprise a presentation (what is to be shown to the user), a model from which the presentation is generated, possibly input parameters for varying what is generated from the model, a set of human expectations that are generated from the model (and are likely determinable from the model but not readily determinable from the presentation without the addition of human mental processing), a criterion related to the presentation, and what would constitute a correct response. The input parameters might be selected from a set of possible input values. A criterion might comprise a prompt or a question, whether explicit or implicit, that is provided to the user along with the presentation and to which the user is expected to respond to. In operation, a challenge generator might generate a challenge from a known model for a class of challenges, having a known correct response that corresponds to the known set of human expectations about the model, so that a challenge processor can easily evaluate whether a user's response is consistent with the presentation and the criterion. The known correct response, or range of acceptable responses, might be stored in a data element referred to as an answer key. The answer key typically is not available to the user device in a computer processible form but might be easily determined by a human with real-world experience. An answered challenge might be represented by a data structure that comprises the elements of the challenge and the user response to the criterion.

The criterion could be in one or more of various forms. For example, for some challenges, the presentation might be an image constructed from a plurality of tiles, the model used for generating the tiles obtains images that are correct depictions of a real-world situation, a first parameter of the challenge data object is an indicator of how many tiles are to be included in an image, a second parameter of the challenge data object is an indicator of which of the tiles depict objects that have been distorted from real-world situations, the set of human expectations are that the tiles of nondistorted objects appear to be correct and the tiles of distorted objects appear to be incorrect, the criterion is a representation of which of the tiles is the distorted one or ones, a prompt is "Select which of these images is not correct?", and the known correct response is an indication of which are the distorted tile(s). A tile might be a subimage, such that the presentation image shown to the user comprises a plurality of subimages that are combined into one image. In some embodiments, the challenge data object data that the user device receives does not have a clear indication of boundaries between tiles, and that might be left to the user to discern, as needed.

When stored as data, in a challenge data object or otherwise, a criterion might comprise one or more data elements about the presentation or a portion thereof, such as of a tile of a multi-tile image, that indicate a condition or characteristic of the challenge data object (e.g., "the top center tile is the correct one", "the sum of the dice depicted is fourteen", "in the five-by-five tile array each of the bottom corner tiles are correct and the rest are incorrect", "only the maze in the upper left tile is solvable", etc.), a prompt that is to be presented to the user ((e.g., "which image shows something that is correct?", "which image shows something that is not correct?", "what is the sum on the number rolled on the dice in the image below?", "which of the tiles are correct?", "which maze will allow the mouse to reach the cheese?", etc.), and an answer key (e.g., one or more index values, such as index values 1-6 where values 1-3 refer to a top row of a three-by-two array and 4-6 refer to a bottom row of the three-by-two array. When a user picks a tile, the tile's index number is conveyed to the challenge server. The challenge server compares the index number given by the user device to the answer key. The criterion could relate to something about a single image, something about multiple images, or an indication of which of a plurality of images have some characteristic. The index values might refer to other aspects of the challenge.

In another embodiment, the presentation is an image, the criterion is some feature of what is depicted in the image, and the prompt requests that the user indicate that feature. Thus, in one embodiment, a six-tile image might be shown with a prompt of "Select the image that is distorted." while in another embodiment, a one-time image might be shown with a prompt of "Is the image distorted?". In yet another variation, the prompt is a multiple-choice question and the choices might not be given, but the user expected to know from real-world experience what those multiple choices are.

For example, a challenge creation routine might generate a challenge based on a random or arbitrary input number selected from an input set and a model, wherein each selected input number might generate a challenge with a different answer, but all based on the same model. In a very simple example, a model might be a virtual scene of an analog wall clock above a table where people are seated eating near a window and an input number might correlate to a time of day. Many such challenges could be generated with the analog wall clock showing different times. The criterion for the class of challenges might be "What meal are they eating?" with the correct answers depending on the time on the clock. For example, the challenge creation system could be programmed with a rule that it is to generate a large number of challenges, each only varying in a clock time from 5 AM to 11 PM with the generated images showing the clock and showing the sun in a window if the clock time is between certain hours. The challenge data object might include that the pre-determined human expectation would be "breakfast" for those challenges created for a time of day of 5 AM to 11 AM, "lunch" for those challenges created for a time of day of 11:01 AM to 3 PM, and "dinner" for those challenges created for a time of day of 3:01 PM to 11 PM.

Those same images could be used with the prior example embodiments, such as a presentation comprising a one-tile image of the virtual scene and a prompt of "Are they eating breakfast?" or a presentation comprising a multiple-tile image wherein each tile shows the virtual scene and the clock times might vary, and a prompt of "Select the tile in which the people are eating breakfast." In each case, the challenge creation routine knows the correct answer without having to analyze the image or images, because the challenge was generated from a model and parameters indicative of the correct answer.

In yet another example, the model represents a virtual scene of three tossed six-sided dice and a set of parameters indicates how those dice are to be oriented. An input set from which the input parameter is selected might be the set of integers from three to eighteen inclusive and the challenge generator might generate an image of a scene of the three dice on a table arranged so that the sum of the pips on their top faces sum to the input parameter. If such an image is part of a presentation to a user, a user might be expected to reply with the input parameter. The user device itself might not easily determine the input parameter, as the challenge data object did not include an explicit indication of the input parameter and determining that input parameter (e.g., the sum of pips of the top faces of the dice) requires an understanding of how a die is counted (we look at its top face, by convention, not the other faces), that the number of pips, by convention, indicate a value of a face, as well as an understanding of what a die is and how to visually determine which face is the top face. However, a typical user might be expected to easily determine the input parameter, and thus the correct answer to the prompt, by looking at the image. As with the other examples, the challenge could be in the form of an open-ended question ("What is the sum of the dice that are shown in the image?"), a multiple-choice question ("What is the value, from three to eighteen, of the sum of the dice that are shown in the image?"), a yes/no question ("Is the sum of the dice that are shown in the image equal to ten?"), or a multi-tile selection ("Of the eight images of dice that are shown, which one(s) sum to fifteen?"). In each case, since the answers to each of these questions is unambiguously and easily derivable from the input parameters used to generate the presentations in the first place, a large number of challenges can be computer generated that have known answers. This can be the case regardless of the form of the criterion for the challenge data object used. In the specific case of three six-sided die, the input parameter might be selected from the 216 possible combinations of die faces, and some other parameters might be used for generating variations of those (such as the orientation of the side faces), allowing the challenge generator to generate many multiples of 216 different presentations and thus many more challenge data objects.

Figure 11:
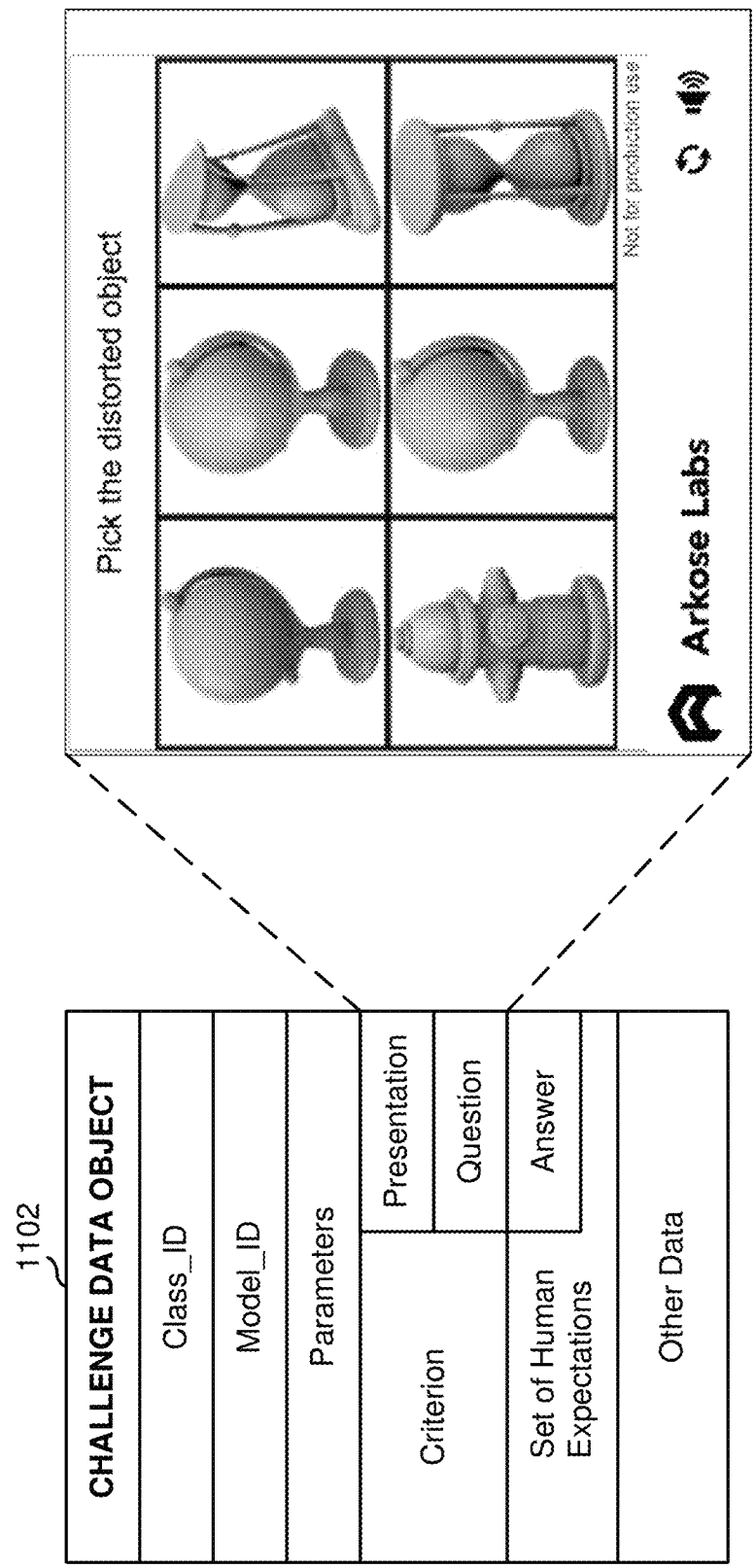
FIG. 11 illustrates an example of a challenge data object, showing an image that might be presented to a user device, data fields indicating criteria to be applied to the image, and other data, according to an embodiment.

FIG. 11 illustrates an example of a challenge data object 1102, showing an image that might be presented to a user device, data fields indicating criteria to be applied to the image, and other data.

In some embodiments, the criterion is in the form of a question. A question might be might be in the form of a selection ("Select one of these N options that is a correct image or sequence according to your logic."), might be asking about a property of what is depicted in a presentation, might be about the correctness of what is depicted in a presentation, etc. In other embodiments, there is a sequence of images that form an animated sequence and the user is prompted to click on the presentation at a time when some condition is present (e.g., an animation of a horse galloping with the prompt "Click at the time when the horse stumbles").

In some embodiments, the challenge data object is generated by a computer from a source, such as a 3D model or other data, and lacks or obscures source data, as can happen when a 3D virtual scene is represented only by an image of the virtual scene, and that source data that is lacking or obscured data is of the nature that it could be expected that an authorized human user would be able to fill in that lacking or obscured data, at least more easily than an unauthorized human user or an unauthorized bot.

In some embodiments, the challenge server requests from the decision server the stored user properties and the stored decision. The challenge server can configure the challenge, if needed, with the challenge configuration being determined by one or more of the user properties, the decision, and the request made by the user device.

The challenge data object might comprise images, properties associated with each image, and the criterion associated with each image. The challenge data object can include the criterion, at least one image associated with the property of being a correct answer to the criterion, and at least one image associated with the property of being an incorrect answer to the criterion. The challenge server can associate each image with a unique image ID. The challenge server can store each image ID, associated with the list of properties of the image, as an answer key for the challenge data object, which references which image IDs are associated with images that satisfy the criterion and therefore are correct, and which image IDs are associated with images that do not satisfy the criterion and therefore are incorrect. The challenge server might assemble the challenge data object. The challenge server might send to the user device the challenge, or part thereof, omitting the answer key and possibly other elements.

Upon receipt, the user device might be configured to display to the user the criterion and the images of a challenge. If the image is animated with multiple frames, the frames are each shown in sequence on the user device. The user, if human, might observe the user device with their eyes and perceive various virtual objects portrayed in the image, thus forming a mental image of each object in the user's brain. The user's mental image of each object portrayed in each image might be similar to the mental image that the user would form if the virtual object were a real object in the real world, observed by the user, behaving according to basic laws of physics and causality. As the user observes the criterion, the user might attempt to apply the criterion to one of the mental images in the user's brain. As the user employs mental processes of evaluation, imagination, association with memory, imagined tests of assumptions, and hypothesis, they evaluate the mental image. In so doing, the user is evaluating not merely the digital image displayed on the user device, but also evaluating the mental image formed in the user's brain as a result of observing the digital image.

The evaluation can therefore account for information about each virtual object such as the position in three-dimensional space the object must have had when the two-dimensional digital image was rendered, properties of the virtual object that are not literally portrayed in the two-dimensional digital image but which the user concludes that the object must have, concluding this by using the human faculties of reason, logic, and inference, and properties of real objects and events that the virtual objects portray, such properties being known to the user through real-world experience but not literally visible in the image. When the user evaluates the mental image as meeting the criterion, the user might conclude that the digital image that produced the mental image is one that should be chosen as a correct answer to the criterion. The user in this way evaluates each of the mental images produced by looking at each of the digital images and produces one or more conclusions about which images should be chosen.

A user might operate an interface of the user device to choose which one or more images satisfy the criterion. The user device can then send the image IDs of the selected images to the challenge server. The challenge server can compare the IDs chosen by the user to the answer key. The challenge server can determine whether the user should receive the service of value (such as access to computer resources) from the value server, and whether the user should complete a new challenge. The determination might be based on whether the user chose images that satisfied the criterion. The challenge server can additionally send a request to the decision server, including the number of correct images the user selected, and the decision server can respond with a new decision. The challenge server can again determine whether the user should receive the value from the value server, and whether the user must complete a new challenge. If the challenge server determines that the user must complete a new challenge, the above process can be repeated. If the challenge server determines that the user should receive the value from the value server, the challenge server can send a directive to the user device that the user device request from the value server the service of value. The challenge server can store information about the challenge, the user, and the determination whether the challenge was successfully completed or not.

The user device can send to the value server a set of validation data describing the challenge and a request that the value server issue the service of value to the user device.

The value server sends to the challenge server the validation data. The challenge server compares the validation data to information stored about the challenge and the user, and as a result determines whether the validation data is authentic. If the validation data is authentic, the challenge server replies to the value server that the validation data is authentic. The value server can then decide to issue the service of value to the user device. If so decided, the user receives the service of value.

Details of Specific Embodiments of Challenge Data Objects

As described herein, challenge data objects are created, distributed and used for challenges prior to granting access (or during access) to computer resources. In a number of examples described below, a challenge data object includes a set of images, some of which might form a logical time sequence, some of which might have been generated using a 3D modelling program to generate 2D views of 3D scenes.

In some embodiments, the images are generated procedurally rather than manually by an artist or other challenge creator. For example, a challenge creator might specify a list of objects and some parameters and a computer procedure would execute to place the objects in a scene according to the parameters. This could mean that the computer procedure can procedurally generate a large number of images, varying placement of objects, shadows, camera position and angle, and lighting in a virtual scene. Another computer procedure, or the same one, might generate the correctness property value for each image, e.g., assigning a value of "correct" to an image produced by the modelling program that the human user would regard as realistic, adhere to specified criteria, and be in accord with how the objects would behave in the real world. The modelling program, or other program, might simulate physical properties of objects, effects of gravity, flexibility, friction, momentum, collision, reflection, etc. and can do so without requiring manual artist intervention. The images might be more reliably randomized by the computer process than the images would be randomized by human effort. The modelling program might produce images in a manner far more efficient than the efforts of a human artist individually designing and drawing the images.

The correctness property value for a challenge data object might be computer-generated and might be such that it cannot be easily determined from the challenge data object but can be easily determined from source data used to generate the challenge data object. If the correctness property value can be generated in this manner, it could be made harder to determine for a computer process having only access to the challenge data object. For example, if the challenge data object includes a sequence of images that have a time-dependency (e.g., images of infant, toddler, teenager, adult, senior, etc.), a challenge data object generator could know the correctness property value, mix up the order of the images for the challenge data object and not convey the original sequence. The challenge data object generator could generate a large number of different sequences but would maintain complete accuracy as to the correct ordering. This might be preferable over a challenge system where the correct correctness property value is not a priori known but is computer-determined, as that leaves open the possibility that an unauthorized user device would do that same generation. As one example, suppose a challenge is to present a plurality of images, some of which are of flowers, and ask the user to select the flower images. If the flower images were generated by a challenge generator knowing that it was generating flowers for some images and elephants for other images, the challenge generator would unambiguously, easily, and correctly know the correct answer. However, if a computer process were needed to perform pattern recognition on images, where it was not a priori known that they were images of flowers or not, in order to determine the correctness property for the challenge, then an unauthorized user device might also be able to pattern match to identify which images contain flowers. This concern could be addressed by ensuring that details that are known about the source are not conveyed, such as not conveying depth information when conveying an image of a 3D scene that is difficult for a user device to reconstruct but might be intuitive to an authorized user.

As another example, the user might be shown an image of a tangle of ropes and be asked how many distinct ropes are depicted. The specified criteria for that image might include the number of distinct ropes that the challenge creator indicated are present in the image or that is known to a challenge creator computer that programmatically generated the image of ropes from a 3D ropes model.

Figure 12:
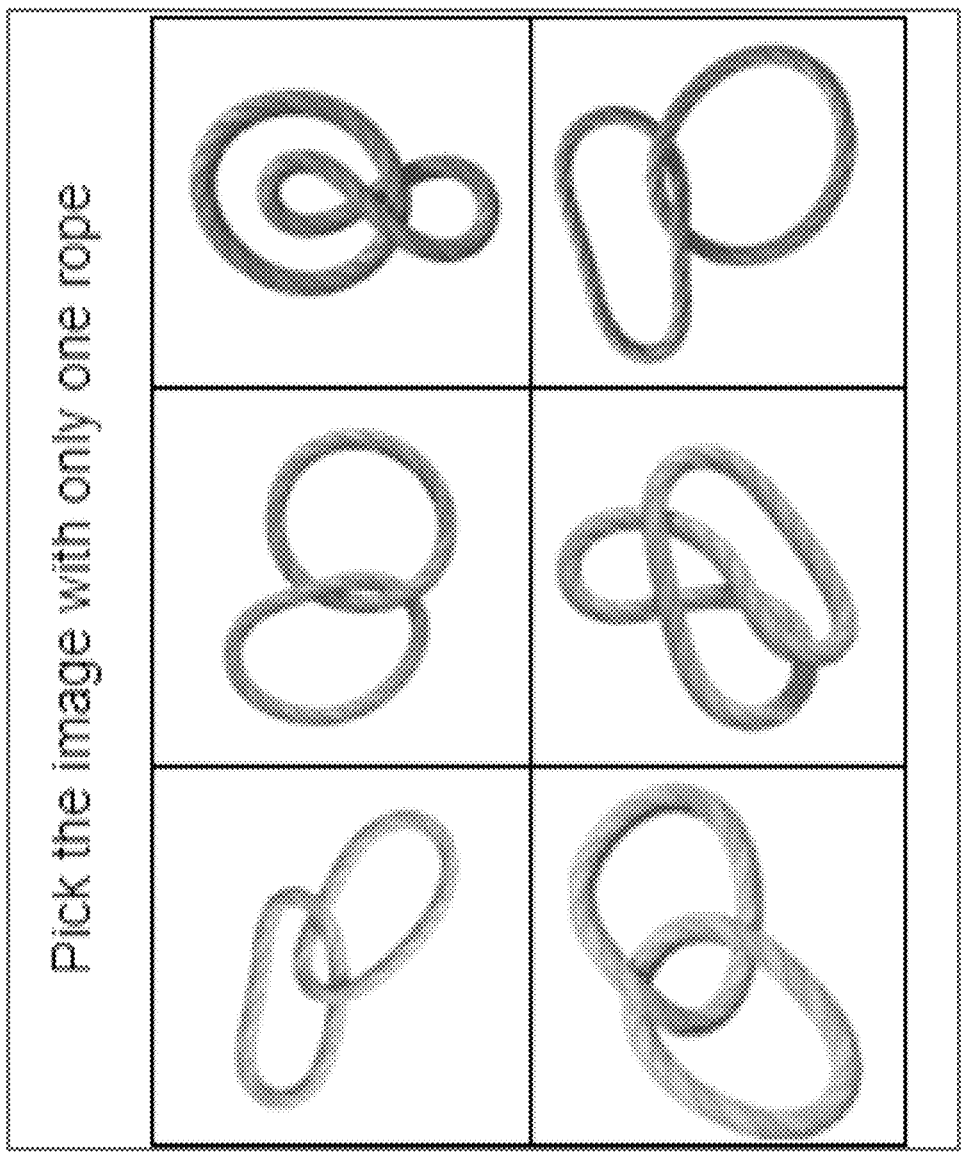
FIG. 12 illustrates an example challenge using a six-tile image, according to an embodiment.

FIG. 12 illustrates an example challenge, according to an embodiment. In that challenge, a presentation 1200 shown in the figure is a six-tile image, the prompt is "Pick the image with only one rope" and the answer key is "lower middle image." Since the challenge generator generated the six tiles from geometric models, one of which had only a single rope object, the challenge generator knows the answer key. Note that a large number of rope images can be generated by the challenge generator, some meeting the criterion and some not.

As another example, an image might depict an object, a light source, and a shadow that a human would recognize as being inconsistent or consistent with that object and that light source. As yet another example, the user might be presented with an image of N animals in various rotations and asked to indicate how many animals appear to be upright. The correct number could be a specified criterion for that image.

In some embodiments, an image presented in a composite presentation image made up from a plurality of individually generated images, referred to herein as elemental images. Elemental images can be combined into a composite presentation image that is provided to the user device. The composite presentation image might comprise some elemental images that are correct in that they are consistent with real-world expectations and/or some pre-specified criteria. For example, a composite presentation image comprising six images of animals, three of which are dogs, and a question "How many dogs are there?" might have a pre-specified criterion specifying that a correct answer to this image is "3". In another example, a composite presentation image comprising six images of animals, all with the wrong number of legs or heads might have a pre-specified criterion of "incorrect."

A composite presentation image might comprise some elemental images that are correct and some that are incorrect, according to a challenge generator. A challenge data object might include an image map—which need not be presented to the user—that indicates the regions of the composite presentation image that correspond to which elemental images and/or that might indicate which are correct elemental images and which are incorrect elemental images. In that case, the user might not be able to reconstruct the bounds of individual images or the correctness of them.

In one embodiment, the modelling program uses a virtual camera to render the composite image from a virtual scene, and the virtual scene contains multiple virtual objects, each of which is rendered as an individual image merged into the composite image. A plurality of composite images might be composed into a digital animated sequence that shows the images moving and changing within the digital animated sequence. The images might move in the virtual scene in a manner that makes the images occasionally occlude each other and the user might be prompted with a challenge to indicate where the overlap occurs. The user selection might be in the form of coordinate values of where on the image or composite image the user selected. The user selection might be a position, a pixel indicator, or just which single image was selected among the images that appear within the composite image. The challenge server can determine whether the response point designates a correct image by virtue of the challenge server having stored a record of which images were placed in associated locations within the composite image. The determination might be done by the modelling program making an answer key render of the virtual scene, in which the textures of a 3D virtual object associated with a correct response that conforms to the criterion, at the moment at which the response is correct, is replaced with a texture that comprises a correct key colour associated with the property of "correct", and textures of all virtual objects at all other moments are replaced with a texture that comprises an incorrect key colour associated with the property of "incorrect", so that the answer key render contains the correct key colour in the pixels associated with response points in the composite image that would constitute a correct answer to the criterion, and this answer key render is stored on the challenge server, and the response point sent by the user can be compared to the answer key render to yield the user response as correct or incorrect, in effect texture mapping the answers.

The composite images can make bot parsing more difficult, as elemental images cross over and occlude each other as they move. This also allows for the addition of elements of timing such as to click a part of the composite image in the particular time and place when two elemental images touch each other.

Example Challenge Generation

In some embodiments of an authentication system, an automated tool is used to generate a large number of distinct challenges, perhaps all of a similar class of challenge, but with different settings and different answers. In some aspects, each challenge can comprise a presentation, a criterion (such as a query), a set of possible responses to the presentation, and a correct response to the presentation. In a specific example, a presentation might comprise an image showing three sheep, a criterion might comprise the question "How many sheep are in the image?", a set of possible responses might be the numbers from "0" to "12", and the correct response might be "3". In some embodiments, the correct response is determined programmatically based on an input to a presentation generation system. For example, a presentation generation system might generate a random integer between zero and twelve, inclusive, and then have a program generate an image by adding in that integer number of sheep and store the integer as the correct response. When the presentation is sent to a user device, it might just be the image and not include a computer readable field indicating the correct response. However, since the integer was stored, a verification system knows the correct response and can easily compare it to a user response. Likewise, if the presentation is an image of a 3D virtual scene constructed from a 3D model of objects, the presentation generation system might store some data known of the 3D model as the correct response and only send the image to a user device.

The data known of the 3D model might be information that is not computationally derived from the image itself but is computationally derived from the information used to generate the image. That way, many images and the corresponding known data could be computationally generated, thus reducing human challenge creation efforts, but because the known data is not transmitted with the image, a user computer attempting to guess at what the known data is might have a hard time of it from just the image. For example, the known data is that of six tiles, the one in the upper left is of a distorted object. The image to be presented to the user can be generated such that it is known that the upper left tile is the distorted one, but that knowledge is not explicitly transmitted with the image. Instead, the user needs to supply that omitted information and with the appropriate images, a human user can easily mentally determine that omitted information while the user device cannot easily do so using computational processes. Unlike manual image tagging, a human at the challenge creation end is not needed to flag which one of the tiles is distorted, as the challenge creation system deliberately applied the distortion and kept track of it.

In another specific example, a 3D artist might design a challenge puzzle in which the correct response, or criterion of the challenge is: "Pick the image that contains only one rope" and use a rope image generator of a presentation generation system that generates an image having a pre-specified number of ropes, which number is stored with reference to the challenge as the correct response to the criterion. The rope image generation system might also generate a presentation image that contains multiple tiles, each of which depict one or more rope. The rope image generation system might make the ropes tangled and folded up to make it hard for an automated computer program to distinguish the correct images from the incorrect images, while allowing for a human user using human faculties of reason, logic, and inference to easily evaluate the images to correctly respond to the prompt "Select the tile that depicts N ropes." In a specific example, the presentation comprises a six-tile image and the criterion is to select the correct tile based on the prompt. The user device might display to the user the prompt: "Pick the image that contains only one rope" with one of the tiles having the property of "one rope" and five tiles having the property of "not one rope."

In other examples, a 3D artist might use a presentation generation system to create virtual objects such as a funnel, a table, a single loop of rope, and a linked pair of rope loops in which a loop of rope is linked to another loop of rope to that, if they were real objects, the loops could not be moved away from each other to any great distance without breaking one of the loops. The presentation might include a virtual scene in which objects are positioned so that the funnel is positioned over the table, and the single loop of rope is positioned above the mouth of the funnel. The rope, funnel, and table might be in positions slightly modified by random number generators in presentation generation system to generate a large number of challenges in this class of rope behavior challenges. The presentation generation system might simulate what would happen in a real scene of the same configuration and how the rope and other elements would move, with the loop obeying gravity, falling into the funnel, sliding and tangling, in keeping with the rope's flexible nature, then slide out of the funnel, fall onto the table, and settle to a stationary state on the table in a tangle such that the loop of rope has a plurality of twists, folds, and places in which one section of rope lies on top of another section of rope. Many variations of this class of animated challenges might be generated and for each, the presentation generation system could store parameters that were used for the simulation but are not embedded in the resulting animation, while outputting an animated two-dimensional image of the rope falling onto the table and settling into a stationary state consistent with the simulation, which would generate animations known to be visually correct. For these, the criterion might be "which of these images depicts only one rope" and the correct response is selecting the tile showing one rope. The user device might display to the user the criterion as the text of a query: "Pick the image that contains only one rope" with one of the images with the property of "one rope" and five images with the property of "not one rope."

In another variation, the user is provided the criterion "How many ropes are there?", a presentation image shows a single rope, and the correct response is "One." The presentation generation system could generate other images or animations that use a 3D model of linked pair of rope loops and perform simulation to generate the presentation images. In another example, where it is known that the 3D model comprises a pair of rope loops, the presentation generation system could store a different correct response for this case, wherein the correct response to the criterion "How many ropes are there?" is "Two."

In a variation, the criterion is "Is there only one rope here?" and the correct response to the criterion for the first case is "Yes" and for the second case is "No." In yet another variation, multiple presentations might be presented the criterion is to select the correct one of the multiple presentations.

A user device might convey the user's response to a challenge server along with a challenge ID. The challenge server can compare the user's response and the challenge ID to the stored correct response. From that, the challenge server can determine that the user should receive access to the protected asset or value from the value server, because the user chose the image that satisfied the criterion. The challenge server might send to the user device a directive that the user device request from the value server serve the asset or service of value, along with validation data. The user device might send to the value server a set of validation data describing the challenge and a request that the value server issue the service of value to the user device. The value server can send to the challenge server the validation data, which the challenge server can compare to the stored information about the challenge and the user, and as a result determine that the validation data is authentic. The challenge server can then reply to the value server that the validation data is authentic.

Where the user fails to choose one of the correct images, the process might flow differently, such that the user does not receive access to the asset or to the service of value. Where a human user is replaced with an insufficiently effective automated computer program, the program might have a high probability of failing to choose one of the correct images, and in such a case, the automated user will not receive access.

Figure 13:
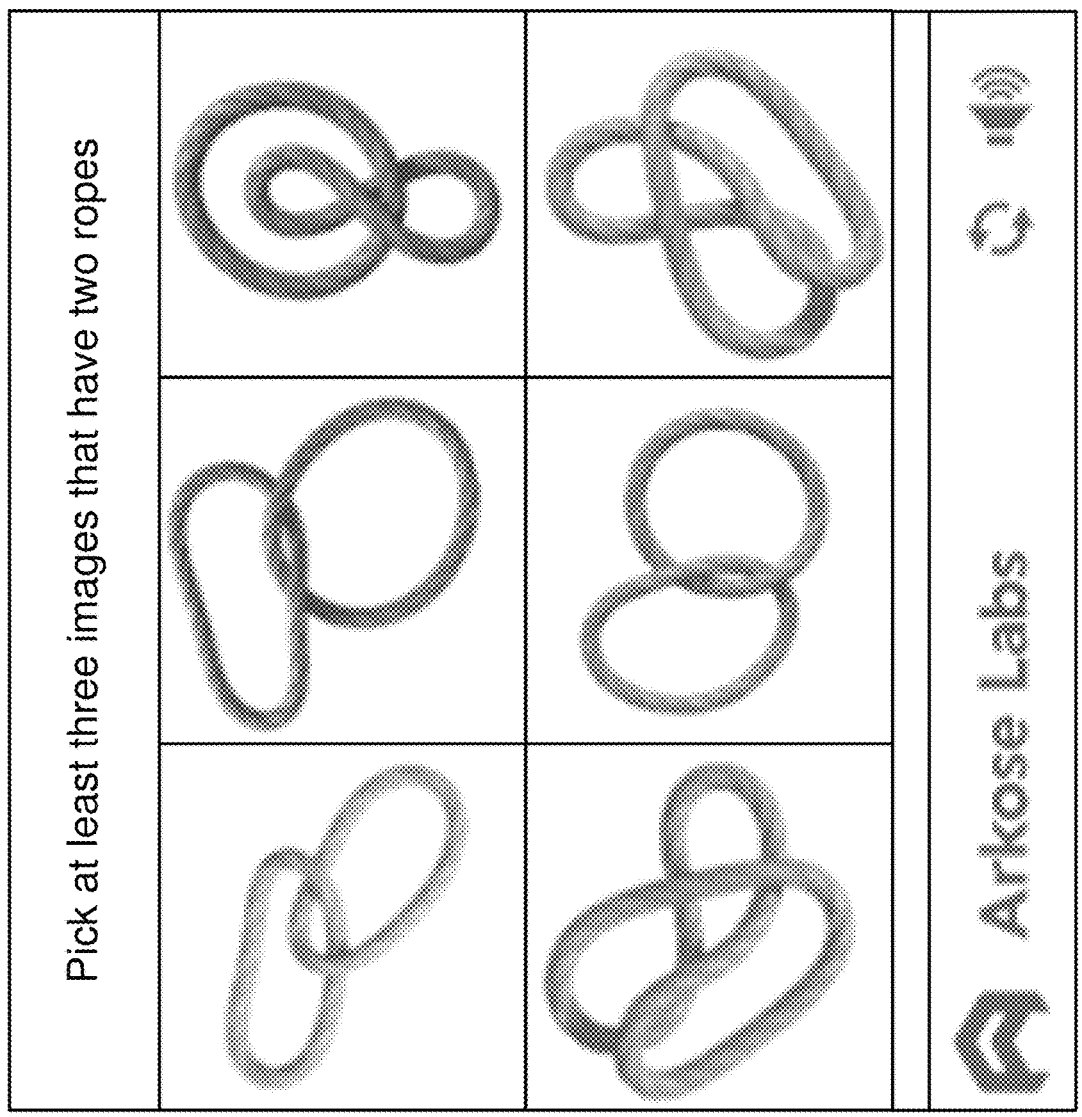
FIG. 13 illustrates an example challenge presentation in which the user is presented with an image comprising six tiles, with each tile depicting one or two ropes, according to an embodiment.

FIG. 13 illustrates an example challenge presentation 1300 in which the user is presented with an image comprising six tiles, with each tile depicting one or two ropes. The user might be requested to select at least three tiles that depict two ropes. The challenge generator can generate a large number of distinct ropes with an input of the known answer. For example, a 3D modeling program can be programmed to accept as an input a value of "1" or "2" and perhaps also parameters of the type of rope to depict, a complexity level, etc. From that, the 3D modeling program determines a curve in 3D space, renders rope along that curve, or curves, and outputs the image or tile. This allows for the simple generation of a large number of challenges without an artist having to draw each challenge. Some of the images used in challenges might be simple, such as the leftmost subimage in the top row in FIG. 13, which a bot might easily determine is a double rope, but if on average, solving such challenges is hard for the bot, discouragement of bots might still be effected even when a few of the challenge instances are simple. A bot might also struggle where the challenge is to select more than one example, in which case it could still be a significant amount of work when one of the examples is easy to spot. The challenge processor does not need to actually try and solve all of the challenges, as the challenge processor can be supplied the answers from the challenge creation system and/or the challenge server.

Examples of Challenges Generated from 3D Models with Criterion Referring to Aspects Presumed from 2D Renderings In a method of securing a computer resource against unauthorized access by authenticating user devices attempting to access the computer resource, an authentication system might determine a three-dimensional (3D) model of a virtual scene, wherein elements of the virtual scene are selected consistent with human expectations. A challenge might involve presenting a user with a challenge in the form of a two-dimensional (2D) rendering of a three-dimensional (3D) virtual object with simulated real-world properties and posing a query—such as the criterion of the challenge—to the user where the challenge is such that it is likely that the user could form a mental image of the 3D aspects and real-world properties and correctly answer the query.

As an example, a 3D model of a pair of six-sided dice having a conventional pip pattern might be used. A data record for the 3D model might be generated, wherein the data record includes references to a pre-determined set of human expectations about the virtual scene, such as the sum of the pips on the topmost faces of each die wherein elements of the model convey orientation, or a pre-determined value of "incorrect" when the 3D model includes an elephant with twenty legs and "correct" when the 3D model includes an elephant with four legs. The authentication system might generate a two-dimensional (2D) image of the virtual scene, such as a view of the dice from a virtual camera position or of the modeled elephant.

A challenge data structure might be sent to a user device, wherein the challenge data structure includes the 2D image and a user response obtained that represents a user-provided set of expectations about the virtual scene. The authentication system or other validation system might determine whether the user-provided set of expectations is consistent with the pre-determined set of human expectations and providing access, or signaling provision of access, to the computer resource for the user device based on whether the set of expectations is consistent with the pre-determined set of human expectations, for example when the user response for the sum of the pips matches the stored sum of the pips or the user response to whether the elephant is a real elephant or not is correctly answered.

Other classes of challenges might be used, and the classes of challenges might be mixed. Examples include:

Wrong shadow: The presentation generator generates a plurality of images, some of which have shadowing that is intentionally inconsistent with the 3D model. Such a challenge would have a pre-determined set of human expectations along the lines of "incorrect shadowing" and the criterion might be "Choose the image of this set of images in which an object is casting a shadow that does not match the object." Each image might be made by placing a virtual object in the scene, placing a virtual light to one side of the object so that it casts a shadow, and placing a virtual wall on the side of the object opposite the object so that the shadow is cast upon the wall. An image comprising a correct answer to the criterion portrays an object casting a shadow that does not match the object, for example a houseplant casting the shadow of a dog; and an image comprising an incorrect answer to the criterion portrays an object casting a shadow which does match the object, for example a houseplant casting the shadow of that houseplant. It will be appreciated that many other objects can be placed into the scene that could meet the criterion if the shadow matched the object, and which would fail to meet the criterion if the shadow did not match the object. As with other challenges, the criterion might be a binary one (e.g., "Is this image logically correct?") or a multiple choice one (e.g., "Which of these images is logically correct?").

Examples of Challenges

In various examples provided herein, a challenge data object might have a presentation that is generated by a challenge generator and a prompt that prompts the user to provide an answer that is consistent with an answer key that is determined based on parameters used to generate the presentation in the first place. The user, if a human not attempting a bypass can be expected to correctly respond to the prompt, such as by selecting a correct tile of a multi-tile image or a multi-tile sequence. Where a challenge server determines that the response was not correct, the challenge server can determine that the user should complete a new challenge and proceed accordingly.

Challenges Generated from 3D Models with Criterion Referring to Aspects Presumed from 2D Renderings Glass Animal: The criterion is whether the rendering is of a pattern being refracted from a glass object that is shaped as a known animal. The presentation might be a 2D rendering of a virtual scene where a virtual refractive glass object is placed in front of an array of dots. Where the refractive glass object is shaped as a known animal, such as horse or a dog, the resulting image will meet the criterion, but where the refractive glass object is not shaped like any known or expected animal, is absent, or is clearly some inanimate object (e.g., a car, a building, etc.) the resulting image will not meet the criterion. The prompt might be "Choose the image that portrays an animal". In some variations, the presentation is an animation of the glass object and/or the camera and/or a background of a field of virtual dots moving, so that dots are seen at times through the glass object and the position of each dot seen through the glass is displaced by comparison to the position the dot would have if not seen through the glass. The criterion might be an image of a specific animal and the prompt might be "Choose the image that shows a dog."

Examples of Challenges Prompting for Recall of Real-World Properties of Real Objects In some classes of challenges, users are presented with 2D renders of virtual objects that resemble real objects and the criterion relates to characteristics of those real-world objects, such as their quantity, their nature, their correctness, etc.

Dice Counting Example: The input set is a set of integers. The challenge generator selects an input parameter from the input set and, given a model of dice and virtual scene elements, renders an image of a 3D virtual scene in which dice are placed such that it would be apparent to a human viewer which faces of the dice are facing up and wherein the dice are oriented such that the sum of the pips on their top faces equals the input parameter. The input parameter and the resulting image can be stored in the challenge data object. The input parameter can either be encrypted before the challenge data object is sent to the user computer, so that the user computer cannot easily determine it, or the input parameter can be omitted. A challenge server might obtain the input parameter from the challenge generator, possibly in response to a request that includes a specific challenge data object identifier. The presentation might be a multi-tile image, the criterion might be an indicator of which tile contains the sum equal to the input parameter, and the prompt might be "Choose the set of dice that adds up to exactly eighteen".

Figure 14:
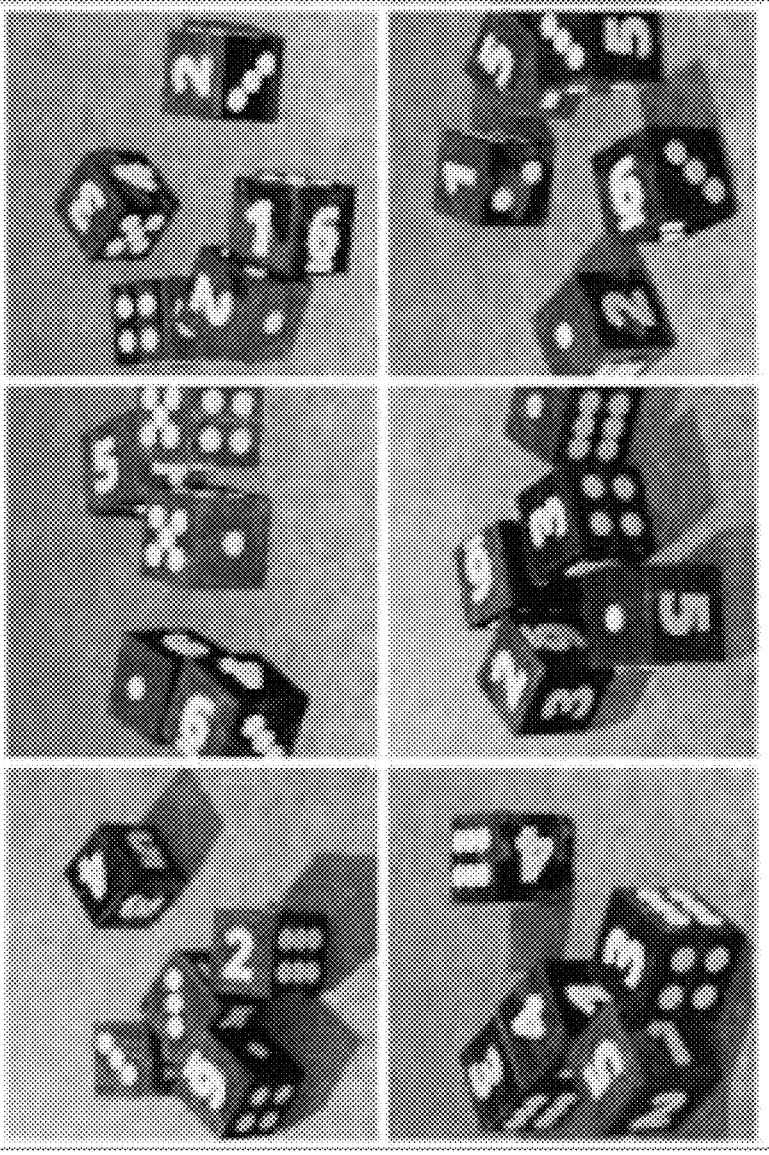
FIG. 14 depicts a presentation of a multi-tile image with a criterion of which tile contains a sum equal to an input parameter and a presentation is of dice, according to an embodiment.

FIG. 14 depicts a presentation 1400 for such a challenge. In that example, the criterion is that the sum of the uppermost faces equal eighteen", the prompt is "Pick the image with dice adding up to 18" and the answer key is "upper left". As should be apparent from this description and the figures, a challenge generator can generate a large number of images from a model of multiple dice with varying faces, a virtual surface, and a virtual light. A set of input parameters might be selected from and those might include an indication of how many dice to include, where to place them, what faces they have, which face is facing up, etc. From those parameters, independent of the images that form the presentation, the challenge generator can determine what the answer key is to be.

Each image might be made using a simulation of physical forces in which dice are rolled onto a table so that each die has on its uppermost face a numeral and an image comprising a correct answer to the criterion portrays dice in a configuration so that the addition of all the numerals of all the uppermost faces of all the dice total 18. An image comprising an incorrect answer to the criterion might portray dice in a configuration so that the addition of all the numerals of all the uppermost faces of all the dice total a quantity larger or smaller than 18. It will be appreciated that many different configurations of dice can be depicted that also would meet the criterion, and many other configurations of dice can be depicted that also would fail to meet the criterion and many other criteria can require the total to be one of many other natural numbers; and the number of dice rolled onto the table can be one of many other natural numbers. In part, by using a physics engine type simulation of a dice roll, a challenge developer need not generate an animation manually, to make it appear to be a natural dice roll. The dice may be rolled with a physics simulator to provide arbitrary results but since the simulator knows the sum that is rolled (perhaps by tracking the dice as they roll). This information about the 3D scene is known to the challenge generator, but not known to the user, who merely examines the C.D.O.

Dice Variation 1: The presentation is an image of tiles of dice having varying pip totals among the tiles, the criterion is that one of the tiles shows a higher total than all the others, and the prompt is "Choose the set of dice that wins the game" with the correct answer being selecting the highest total dice tile. It might be that, if the criterion is not met, the next prompt displays to the user a message that the selected image did not depict a set of dice with wins the game, and the user is given a new challenge with the same criterion.

Dice Variation 2: The presentation is an image of tiles of dice having varying pip totals and colours and the criterion is that the total point value of pips on top faces of dice that are blue must exceed the total point value of the dice that are red, and the prompt is "Choose the set of dice that wins the game" with the choice being red or blue.

Dice Pair Variation: The criterion is whether a pair of rolled die have the same value. The presentation might be a multi-tile image wherein each tile depicts two rolled dice. The prompt might be "Choose the set of dice in which the same symbol has been rolled twice". Tile meeting the criterion would depict the pair of dice with uppermost faces showing the same symbol. The symbols might be pips from one to six, other numbers, dice with a symbol set of (hand, face, knife, car, dog, skull), or some other variation.

Figure 15:
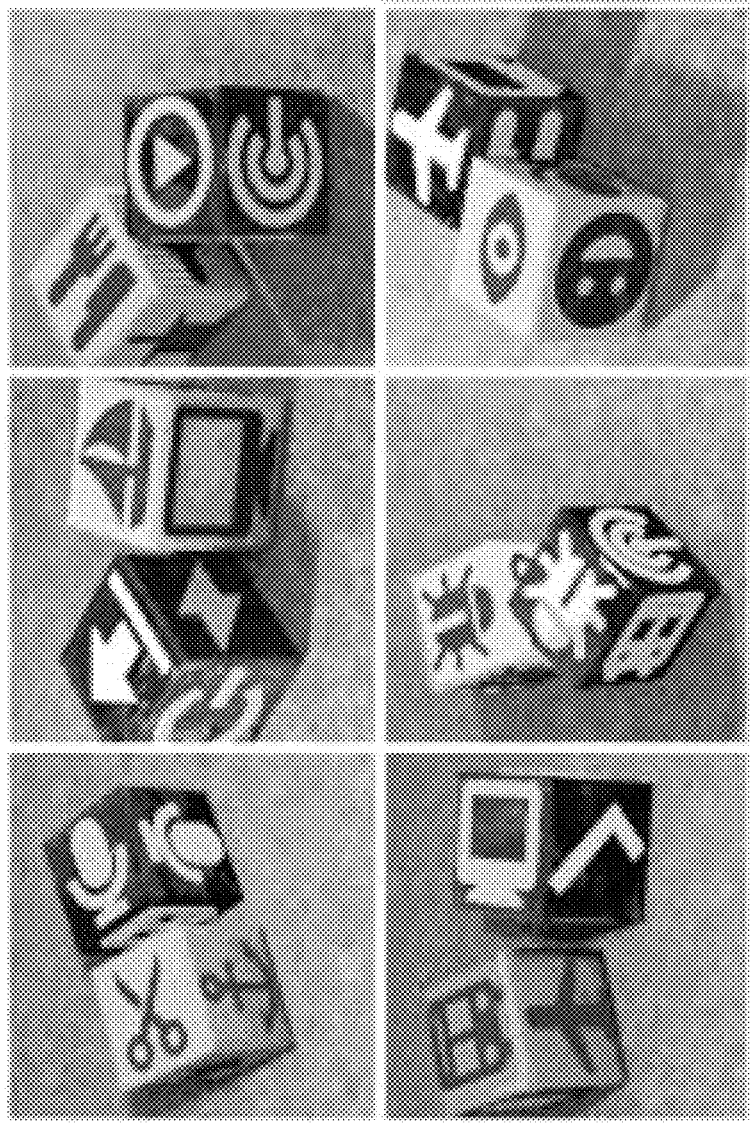
FIG. 15 depicts a presentation of a challenge comprising dice, according to an embodiment.

FIG. 15 depicts a presentation 1500 of such a challenge. There, the prompt is "Pick the dice pair with the same icon facing up" and the answer key is "lower middle" because that is the tile of the six tiles depicted that meets the criterion of having the same object on uppermost faces.

In some variations, the criterion is not explicit from the prompt. For example, instead of the prompt being "Choose the set of dice in which the same symbol has been rolled twice", the prompt might be "Choose the set of dice that wins the game" in which case the user might have to infer that they are being requested to select the tile with the highest pip count.

Person on balcony: The criterion is based on whether an image depicts a person walking on a balcony. The prompt might be "Choose the image in which the person is walking on a balcony". The presentation might be a multi-tile image with each tile depicting virtual people in a virtual scene, walking around and within virtual buildings. The model is an image generation from geometric models and since the challenge generator places the people in scenes, it knows how to unambiguously determine which tiles will meet the criterion. A tile depicting a person walking around while on a balcony area of a building meets the criterion, whereas an image depicting a person walking elsewhere, for example on a sidewalk, viewed through windows, or on a rooftop deck will not meet the criterion. In other variations, different configurations of people and buildings can be depicted, some of which meet the criterion and some that do not.

Solvable maze: The criterion is based on whether an image depicts a virtual maze that is constructed from a model in which a virtual mouse can reach virtual cheese. The model might provide for barriers and hazards that would be readily recognized by human viewers, such as mousetraps. The prompt might be "Choose the maze in which the mouse can safely reach the cheese". An image depicting a maze in which the mouse can reach the cheese without needing to cross through, or over, any walls and without going over a mousetrap would meet the criterion and when the challenge generator generates such a maze, it would indicate in the challenge data object that the criterion is met. Likewise, an image depicting a maze in which the mouse can only reach the cheese by crossing over a wall or going over a mousetrap would not meet the criterion. In other variations, the mazewalker is a person, a dog, a robot, a baby, and/or an insect, etc., and goals other than cheese-seeking might be depicted, such as other foods, money, treasure, desired person, or home.

A challenge might be such that what it is that the mazewalker is seeking is context dependent, such as where the user might be expected to determine mentally, based on real-world experience, what is beneficial to a maze-walker and what is harmful to the maze-walker. A maze might depict one or more of fire, pit, spikes, predator, acid, bread crumbs, leaves, grass, pebbles, prey creature, harmless creatures, and the like. The challenge generator can generate a large number of challenges with different variations based on a set of rules and input parameters. For example, the challenge generator might select some objects (a rat, a hawk, a fire, bread) into a maze and apply predetermined rules to the challenge generator (e.g., rats cannot walk through fire, rats cannot walk past a hawk to get to cheese, etc.) and given that the predetermined rules are known to the challenge generator, the challenge generator knows whether the criterion is being met for a given image.

A large number of mazes could be generated, with different positions of the creatures, goals, and objects can be depicted. The challenge generator might also be programmed to deal with 3D mazes, allowing for combinations of passages that cross over others, go behind others, with floors with walls, tubes, platforms in space, tightropes between poles, logs on water, etc. In each case, there can be predetermined rules that dictate whether or not the generated maze is solvable. In some variations, a rendered 2D view of a virtual 3D maze is depicted that shows only part of the maze at any given moment, and a virtual camera that renders the view can move in a way to expose more of the maze over time to give the user information necessary to apply the criterion to the entire maze, while never seeing the entire maze at one time.

Animal behavior: The criterion is whether animals are depicted with their correct behavior. A prompt might be "Choose the animals that are performing the behavior" followed by a word describing a behavior, for example fighting. Each image might be an animated 2D image produced by rendering a virtual scene in which animated virtual objects portraying animals are placed, for example mice. An image meeting the criterion portrays the animals engaging in a behavior that matches the prompt, for example mice fighting with each other; and an image portraying the animals engaging in other behavior, such as grooming, does not. Actions by the same animals, or actions by different animals, can be depicted that also could meet the criterion and many other criteria could be used to specify many different behaviors that could be portrayed in the image.

Sensible movie scene sequence: The criterion is whether a sequence makes logical sense and the prompt might be "Choose the movie that makes the least amount of logical sense". The presentation might be an image generated by rendering a virtual scene of objects in ways that are often seen in movies, such as actors, costumes, vehicles, weapons, and rooms. An image that portrays a sequence of dramatic scenes that make little logical sense, for example two actors dying of old age together, then getting married, then meeting on a first date, would meet the criterion, whereas an portraying a sequence of dramatic scenes that make much logical sense, for example two actors meeting on a first date, then getting married, then dying of old age together would not meet the criterion (as the criterion that the sequence does not make logical sense based on real-world experience. For another example, a sequence of dramatic scenes that make little logical sense is two actors getting married, then digging a ditch in prisoner's clothes, then escaping the police in a car chase, versus a sequence of dramatic scenes that make much logical sense is two actors robbing a bank, then escaping the police in a car chase, then digging a ditch in prisoner's clothes. Many different scenes of actors and objects can be depicted and whether the scenes meet the criterion would be known to the program that assembles the scene sequences.

Wobbling top: The criterion is which of a plurality of spinning tops is wobbling the most, the prompt is "Choose the spinning top that is wobbling the most", and the answer key corresponds to a tile of an image for which the challenge generator applied the most wobble. Each tile of a multi-tile image might depict a virtual spinning top placed on a table and animate making the top behave like a real top would behave at different points in time as it loses momentum and transitions from an orderly pattern of motion across the table surface to a more chaotic wobbling pattern. An image not meeting the criterion might portray a top moving in an orderly pattern that is not wobbling and an image meeting the criterion is one that depicts a top moving in a chaotic wobbling pattern. Many different top movement patterns can be depicted, and the challenge generator can generate the answer key based on the levels of wobble applied in generating the presentation.

Frankenanimal: The criterion is which animal was assembled from inconsistent body parts. In a specific example, the body parts are a torso/body and a head. The prompt might be which "Choose the animal that has the wrong head" and the answer key corresponds to the image generated by the challenge generator where the challenge generator specifically selected inconsistent body parts, such as selecting a head of a cat and a body of a crab. Each image, such as for a multi-tile image or just an image, can be made by combining models of body parts in a 3D virtual space and rendering a 2D image of the virtual space from a camera position. An image that portrays an animal in which the head of an animal is combined with the body of a different animal would meet the criterion and an image that portrays an animal in which the head of an animal is combined with the body of the same animal, for example a cat head on a cat body, or a crab head on a crab body, would not meet the criterion.

Figure 16:
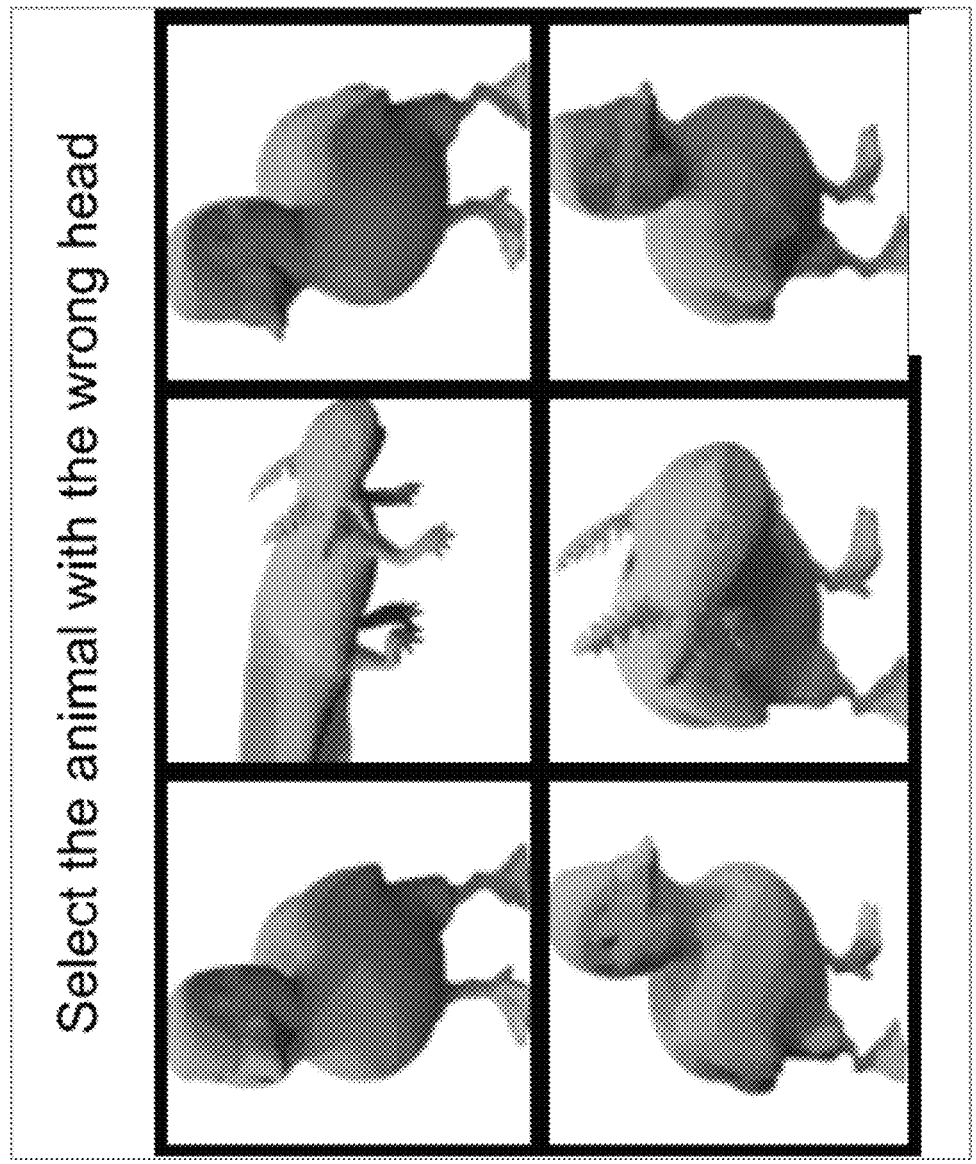
FIG. 16 depicts a presentation for such a challenge image that portrays an animal in which the head of an animal is combined with the body of a different animal, according to an embodiment.

FIG. 16 depicts a presentation 1600 for such a challenge. In that example, the criterion is that an animal has the wrong head, the prompt is "Select the animal with the wrong head"

and the answer key is "lower middle". As should be apparent from this description and the figures, a challenge generator can generate a large number of images from a model that selects from animal bodies and animal heads. From those parameters, independent of the images that form the presentation, the challenge generator can determine what the answer key is to be based on which heads are attached to which bodies.

Figure 17:
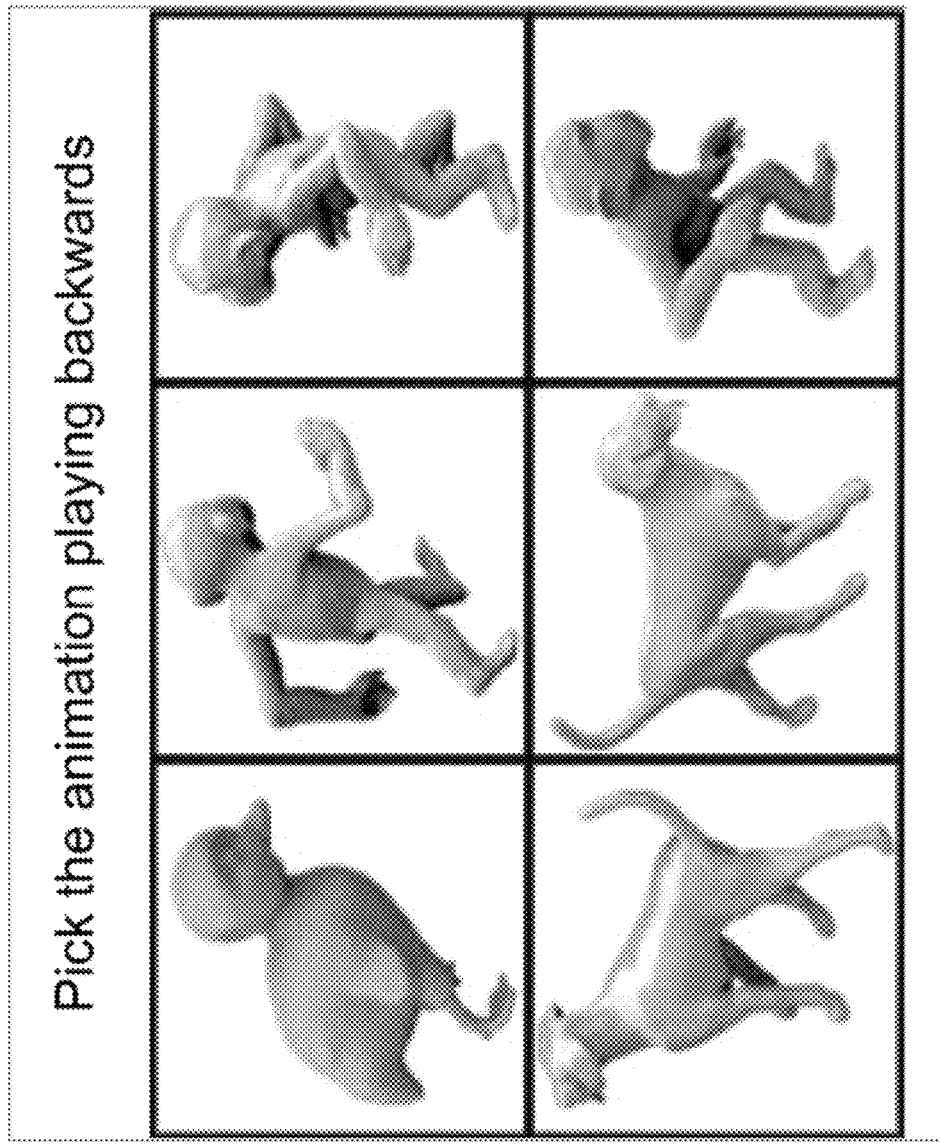
FIG. 17 depicts a presentation for a challenge related to backward nature of characters, wherein the presentation comprises animations, some of which are reversed in time and some of which are not, according to an embodiment.

FIG. 17 depicts a presentation 1700 for a challenge related to "backward nature" of characters, wherein the presentation comprises animations, some of which are reversed in time and some of which are not. The criterion might be the direction of the animation, the prompt might be "Choose the image that is reversed in time" and the answer key corresponds to the images that were generated with reversed time. An image for this challenge might be made by creating a virtual natural phenomenon with a clear direction in time and rendering from it a digital animated sequence that shows the images moving and changing within the digital animated sequence in way that matches what is commonly seen in the natural world. The criterion above would be met for an animated sequence in a reversed order, for example an animated sequence of a campfire in which the flames appear to begin at a large size, then in sequence shrink in size until they disappear into the burning wood, whereas an animated sequence in a forward order would not be, such as an animated sequence of a campfire in which small flames appear at the surface of burning wood then in sequence grow in size until they dissipate. For another example, an animated sequence portraying a horse galloping forward along the ground, which fails to meet the criterion, can be revised into a new animated sequence with the frames in a reverse order so that the new animated sequence portrays a horse galloping backwards, which meets the criterion. Many different animated sequences can be depicted that meet the criterion or not. Frames of an animated sequence that fails to meet the criterion can be rearranged into a new animated sequence with the same frames in a reverse order so that the new animated sequence might meet the criterion.

While animation is not depicted in FIG. 17, the criterion could be that the animation appears to show an animal walking backwards, the prompt could be "Pick the animation playing backwards" and the answer key would be the image in which the animation is running in reverse. As should be apparent from this description and the figures, a challenge generator can generate a large number of images from a model that selects from animal models and selects whether to animate it forward or in reverse.

Warped objects: The criterion is that an image was generated by warping or distorting a 3D model of an everyday object, the prompt might be "Choose the object that is warped", and the answer key corresponds to the tile of a multi-tile image or whether a given image is one with distortion applied. As with other challenges, where the challenge generator stores an indicator of which tile was distorted or whether distortion was applied to a given tile, it can store that as the answer key, or unambiguously derive the answer key. For example, if the challenge generator generates a 2D rendering of N objects to form N tiles and applies distortion to the M-th tile, it can store as the answer key for the criterion the value M, as it is known that the M-th tile is the distorted one. Then, when an image of the N tiles is presented as the presentation to the user, if the user selects the M-th tile, the challenge server that evaluates the user's response would know from the challenge data object that the answer key comprises "M" as the valid answer. Alternatively, the boundaries of the tiles might be stored as the answer key and any user click at a point in the image that is within the boundary of the M-th tile would constitute a correct answer.

Each image might be made by placing a commonly recognized virtual object into a virtual scene and either distorting it or not, then rendering as a 2D image. Distortion might be by arbitrarily distorting a 3D model, for example a bicycle that has been bent and twisted so that it could not be ridden upon, in which case that image would meet the criterion. Many different objects can be depicted that also would meet the criterion, and many other objects could be depicted that also would fail to meet the criterion. An object that is distorted could be warped in many different ways, and each variation could result in an image of the object that would meet the criterion.

Figure 18:
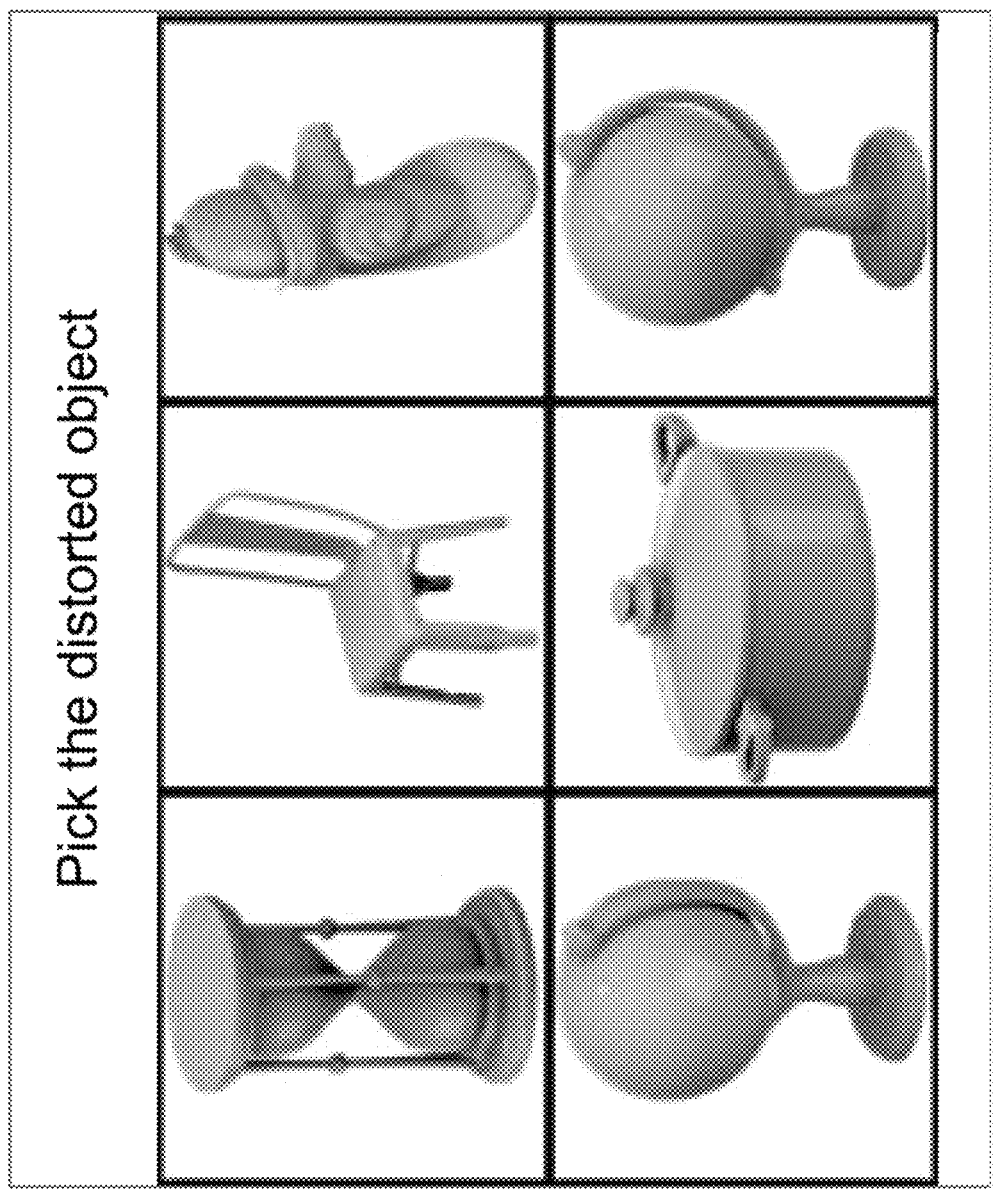
FIG. 18 depicts a presentation for a challenge in which tiles depict distorted objects.

FIG. 18 depicts a presentation 1800 for such a challenge. In that example, the criterion is that a tile has a distorted object, the prompt is "Pick the distorted object" and the answer "upper right". As should be apparent from this description and the figures, a challenge generator can generate a large number of images from a model that selects from models of objects and distorts some of them. The challenge generator might begin with a large collection of objects (or a small collection of objects with variations) that are modeled as 3D virtual objects representing everyday items. In the example of 18, those items are an hourglass, a chair, a fire hydrant, a globe, and a pot. The image itself does not indicate which objects are distorted, nor can a computer process easily determine that all of the tiles depict everyday items, but the upper right depiction of a fire hydrant is distorted. However, where the challenge generator selects from a set of objects and then applies distortion to one or more of them, if the challenge generator records which ones it applied distortion to, the challenge generator can unambiguously record the answer key indicative of which tiles are distorted into the challenge data object. In most cases, being able to correctly identify which tile depicts the distorted object requires knowledge of what chairs typically look like, what a globe looks like, etc., iconically or otherwise and a human user might be expected to readily determine those.

In other variations, the prompt, criteria, and answer key might be different for the same or similar presentation just using a related, but different criterion. For example, a challenge might have a presentation of an image comprising just one of the six tiles shown in FIG. 18 with the criterion being "this image is distorted" or "this image is not distorted" with a corresponding prompt being "Is this image distorted?" and in another variation, multiple tiles are shown and the prompt is "How many of these objects are distorted?", with the answer keys being set to the appropriate answer.

Count the pile of objects: The criterion is whether a depicted pile meets the condition, such as the pile having exactly five distinct objects, the prompt might be "Choose the pile that contains exactly five objects", and the answer key would indicate which of the piles was generated by the challenge generator to have exactly five objects. The objects can be animals and can be placed by specifying positions of the objects or can be placed by executing a simulator that simulates physical forces applied to virtual objects to pile them up, possibly with object overlapping one or more other objects, for example the animals lying together as a den of sleeping animals may lie. An image meeting the criterion would be one that portrays a pile of exactly five objects, otherwise the image would not meet the criterion. A computer process not having access to the inputs the challenge generator used to generate the objects might have a difficult time counting the objects correctly, but a person with real-world experience would quickly correctly determine a count of objects in a pile. In other variations, the criterion might be more than five or less than five, but preferably not so large a number that even a skilled human would have trouble correctly counting the number of objects in a pile.

Count the arrows pointing upward: The criterion is an image in which exactly three arrows are pointing up, and the prompt is "Choose the image in which exactly three arrows are pointing directly up", or similarly, the presentation is an interactive display having arrow icons for rotating clockwise or counterclockwise an image of a ball containing arrows and the prompt is to click the icons to rotate the ball to have exactly three arrows pointing up. The challenge generator can generate a presentation image by placing virtual arrows in a scene within a circle (or not), where each arrow is arbitrarily oriented to point in one of several distinct directions, including an upward direction that a user familiar with the real-world concept of an arrow would recognize as upward, and in which the challenge generator knows how many of the arrows are pointing upward. An image comprising a correct answer to the criterion portrays exactly three arrows pointing upward and a number of other arrows not pointing upward. An image comprising an incorrect answer to the criterion portrays a number of arrows pointing upward that is greater or less than three. In other variations, the number of arrows is other than three and/or the user might be asked to state the number. In other variations, virtual objects other than arrows can be used.

Figure 19:
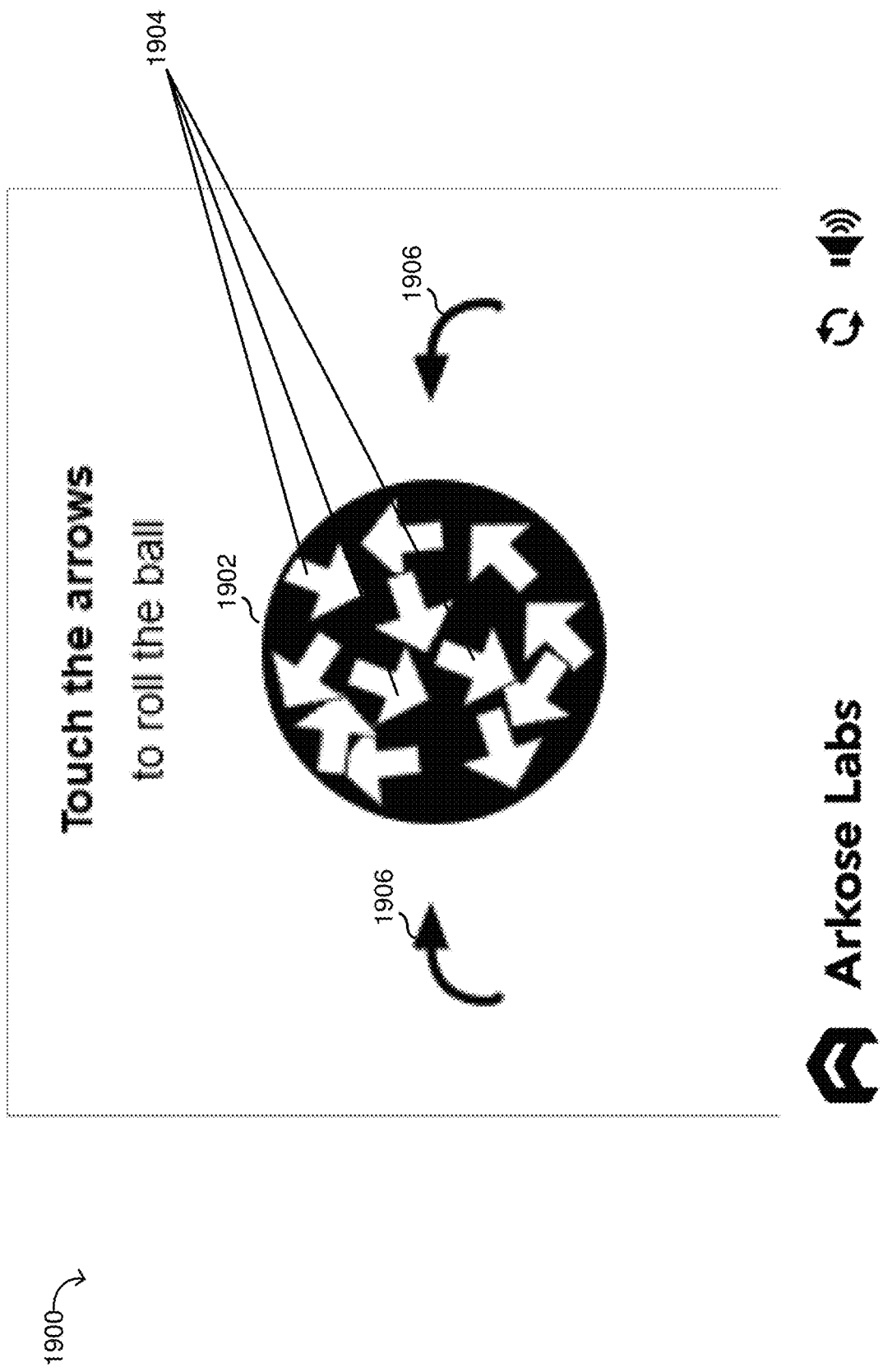
FIG. 19 depicts a presentation for a challenge depicting arrows, according to an embodiment.

FIG. 19 depicts a presentation 1900 for such a challenge. In that example, the criterion is that the net number of clicks of the arrow icons needs to sum to a number of shifts needed so that there are three arrows pointing up. The prompt is "Touch the arrow icons to roll the ball" and the answer is the number of clicks on icons 1906 needed to rotate a ball 1902 so that arrows 1904 are pointing directly up. As should be apparent from this description and the figures, a challenge generator can generate a large number of images from a model that selects arrows and orientations. Where the challenge generator selects from a set of orientations, if the challenge generator records which orientation three of the arrows have and the initial orientation of the ball, the challenge generator can unambiguously record the answer key indicative of how many net clicks (clockwise rotations versus counterclockwise rotations) are needed to have those three arrows pointing up.

In another variation, the presentation comprises a plurality of tiles each having a ball containing arrows with varying orientations, the criterion condition is that the required number of arrows are pointing up, and the prompt is "select the image with N arrows pointing directly up.

Possible Variants

The various examples of challenges described herein might be implemented in a basic form, or variants with specific features might be constructed. In general, one aspect of many of the challenges is that a human user might need to spend some amount of time to evaluate whether the presentation of the challenge meets the pre-determined criterion. Another aspect of many of the challenges is that a large number of separate challenges can be generated of a given class of challenges and therefore, with minimal effort, a challenge creator can create a large number of presentations, each of which might require a separate amount of human user time when the challenges are distinct enough that the human effort cannot be easily amortized over multiple challenges. In some cases, this is because each challenge of a class of challenges must be solved separately despite all being generated by one challenge creation process. This can make it economical to create a large number of challenges, economical and not inconvenient for one human user to solve one challenge, and somewhat uneconomical for a human user or an organization of unauthorized accessors to expend many multiples of the single challenge solving when trying to obtain access to protected computer resources. For example, where the input set is the set of integers from 1 to 100,000, the class of challenges might comprise up to 100,000 distinct challenges. If the output of an automated challenge generator is simply an image of the digits of the selected input, distorted to prevent optical character recognition, there might be 100,000 distinct challenges, but after experiencing a few challenges in the class, the amount of effort needed on the part of a bypasser or a bot is much lower for subsequent challenges. In contrast, where the solving of prior challenges does not significantly reduce the amount of effort needed to solve other challenges, even in the same class, a legitimate users would have to deal with one challenge (or a few challenges, should they misunderstand the first challenge presented), an automated process or a bypasser would have to deal with many multiples of that amount of effort.

In one aspect, generating a large number of challenges of a class of challenges, all or most of which need to be solved independently, can be done by implementing a modeling program that generates output using a 3D modeling program having an input that can be a known arbitrary or random value selected from a large input set. Challenge creation could be more efficient, on a per-challenge basis, than—for example—having a challenge creator create each individual challenge presentation using a 3D modelling and rendering process wherein a 3D artist must use their own effort to manipulate and position objects, camera, and lights in a virtual scene.

Images produced by a 3D modelling program that is driven by a selection from a large input set might simulate virtual objects in a variation drive by the selection and a manner that the human user would regard as realistic, correct, or otherwise meeting a criterion, such as how the objects would behave in the real world. To do so, a 3D modelling program might simulate physical properties of objects, such as the effects of gravity, flexibility, friction, momentum, collision, and light shining on materials, where the effects and/or degree are determined, at least in part, by the selection from the input set and the selection can be withheld so that the user does not know what values where used to generate the challenge.

In a very simple example, which might be easily defeated given its simplicity but is used here for illustration of one aspect, the input set is a set of angles from 0 to 350 degrees, in steps of 10 degrees. A challenge generator generates a selection from the input set, an angle, and inputs the angle into a 3D modeling program and the 3D modeling program is programmed to output an image of a sharpened pencil having a flat eraser with the pencil oriented such that a ray pointing in the direction of the pencil tip forms an angle with an X axis equal to the selection. The criterion posited to the user is the question "Will this pencil fall over?" The correct user response to the image generated when the selection was 90 degrees is "No" but is "Yes" for all other selection values. Since the selection was known when the challenge was generated, the correct answer is known. Since the image presented as part of the presentation to the user does not need to include a data field indicating that the angle of the pencil is 90 degrees, the challenge would require that the user figure out and know from real-world experience that a sharpened pencil will fall over unless it is oriented with its flat eraser directly underneath the center of gravity of the pencil. In this example, although simplified, it can be noted that 36 distinct challenges could be generated from the effort of the challenge creator creating one challenge class. In practice, the number of challenges in a challenge class could be much larger than 36 and using this approach, a challenge generator might be able to generate challenges faster, with less memory use, and with less energy expenditure. The challenges might be more reliably randomized than if they were randomized by human effort. Also, using a 3D modelling program can produce images in a manner far more efficient than the efforts of a human artist individually designing and drawing images.

In a variation, the presentation is a multi-tile image wherein one of the tiles depicts a pencil at 90 degrees and the others depict a pencil at other angles and the prompt is "Select which of these images that shows a pencil that will not fall over."

Selection from an Input Set

In general, there might be several ways to select the selection from the input set. In addition to variations of the selection process, variants in other aspects of the challenge generation and processing processes are contemplated.

For example, consider the case where the presentation is a 2D animation generated from a 3D model using selections and parameters that are stored as part of a challenge data object and are used for determining a correct user response. Where elements in the animation are rendered from a 3D virtual object and the animation is distorted in some known way, the challenge might be for the human user to determine whether the distortion over time is consistent with real-world objects or not (e.g., a latex balloon getting bigger when being inflated is consistent, a released latex balloon being propelled by its escaping gas getting bigger is inconsistent, a horse with intermittently disappearing and reappearing legs is inconsistent, etc.). In such cases, a nonzero amount of time is needed to play out the animation before the user could be expected to answer. That nonzero amount of time multiplied by one or two might be an insignificant burden on a user, whereas having to expend the time for 1,000 distinct animations in the case of a bypasser could be a significant burden. Such a multiplicity of animations can increase the human labor needed to construct a bot that can examine the moving image and determine that the animations of the objects within the image fit the conditions described in the instruction.

Where the presentation is an animation, some of the depicted objects might change shape, which might make it more difficult for an agent to discern what objects are there.

A challenge processor can determine whether the response is correct by virtue of the challenge processor having access to parameters and details used to generate the animation in the first place, such as tracking which image elements were placed in which locations of the animation. In an efficient storage scheme, the correct answers might be stored as a texture wherein a specific colour might indicate where in the animation a user selection is a correct answer. In a specific example for illustration purposes only, perhaps the challenge is to correctly select, from an image of several horses, which animal is not anatomically correct and one of the horses has cricket bats for legs. In that example, the challenge processor might be provided with an "answer key" image that has one colour where the incorrect horse is present and another colour where correct horses are present. In that case, the challenge processor can simply obtain the user's response in the form of a click on an image location, retrieve the colour in the answer key image at that location, and from that determine whether the user correctly selected the right answer. This might be done for several images in an animation and serve as a map to assess the response of the user.

In some variants, a time limit is imposed on the user to provide a response. This can help thwart bypassers who might try to manage several computers at the same time, solving challenges manually. A human user dealing with a single challenge might be expected to proceed with solving it without delay, whereas a bypasser might be delayed because they are dealing with a challenge on another computer they are managing.

A challenge might include a presentation that is presented in sequence and comprises multiple criterion and queries.

A challenge might include a presentation wherein a number of instances are presented to the user, only one of which is correct according to real-world experience, and the user is instructed to select the correct instance.

Challenge elements might include one of a plurality of visual components, a plurality of audio components, and a plurality of audiovisual components. Challenge elements might include a plurality of visual components in the form of challenge images. The challenge images might include a number of distinct images or a single image with distinct tiles visible within the single image. The challenge images might be configured in a spatial arrangement formed at least in part by the plurality of challenge tiles.

A challenge presentation might include a challenge instruction such as includes a direction for the user to interact with one or more challenge elements, but in other challenges, the presentation might be presented without instructions, with an expectation that a human user can mentally determine what the instructions might be. For example, where six tiles are shown as part of an image where exactly one is incorrect and five are correct, a human user having no instructions might infer that the challenge is to select the incorrect tile. In some challenges, instructions might be used to convey what the user is to do where it might not be apparent to the user what is being requested. For example, where the challenge is to move challenge elements around to place them in an order, make an element go up, down, left, right, in, out, rotate around an axis, etc.

Challenge data objects might be encrypted in transit to reduce abilities to read them in transit. Decryption of challenge data sufficient to generate the presentation at the user device might require a decryption key and the sending of the decryption key might begin a time period in which a correct response is required before timing out.

A challenge might be specific to a particular asset, such as a specific webpage having specific URL, and a response might include an indication of the URL of the webpage on which the challenge was answered. If that URL does not reside in a list of acceptable URLs, the response to the authentication challenge can be deemed an incorrect response.

In a specific class of challenges, presentations are 2D images of a 3D scene, each taken from a different camera position or orientation and a challenge might be to determine which plurality of 2D images are consistent with a common 3D scene. In a specific example, the challenge elements are part of an animation with virtual lights illuminating a 3D object such that a zone of light passes over an object that otherwise is completely dark, portrayed against a completely dark background, so that the whole object is never fully revealed in any one moment during an animation. Such alterations might be done in a way to make it highly labor-intensive to program or train an agent to recognize that two different moving images were rendered from two different virtual three-dimensional scenes that both contain the same three-dimensional object.

Challenge elements that contain 2D challenge images might be subjected to random distortions that result in an image that a human would regard as basically unchanged but require a large amount of labor to program or train an agent to recognize the similarity between the original image and the distorted image. For example, randomly varying a checkerboard pattern on a cafe tablecloth in a cafe scene showing some tables and chairs might be something that looks different to an agent, but a human would note that the changes do not alter what is being depicted.

In the case of challenge elements that contain 3D virtual polygon meshes, each of the meshes might be subjected to random distortions that result in an image that a human would regard as basically unchanged but require a large amount of labor to program or train an agent to recognize the similarity between the original image and the distorted image. A stream of successive instructions might change a 3D mesh to result in a moving image. A challenge generator might construct the mesh from multiple elements and parameters stored by the challenge generator, and apply random changes to the mesh, resulting in a mesh that is sent to a user client, and the client device displays that mesh to the user by use of a program that produces a virtual visual output in a 2D or 3D form, and many such variations could be generated.

In a specific embodiment, a system for user authentication includes an authentication server, the authentication server including a processor coupled to a memory, the memory including program code instructions configured to cause the processor to present an authentication challenge to a user of a computing device, the authentication challenge including a number of challenge elements; receive a response to the authentication challenge from the user, the response including a selection of one or more challenge elements in accordance with an instruction to the user on how to complete the authentication challenge; notify the user whether the user's choice of challenge element correctly complied with the instruction or not; and if the user correctly complied with the instruction, allow the user to perform a computer operation.

A computing device for user authentication might include a processor coupled to a memory, the memory including program code instructions configured to cause the processor to present an authentication challenge to a user of a computing device, the authentication challenge including a number of challenge elements; receive a response to the authentication challenge from the user, the response including a selection of one or more challenge elements in accordance with an instruction to the user on how to complete the authentication challenge; notify the user whether the user's choice of challenge element correctly complied with the instruction or not; and if and only if the user's correctly complied with the instruction, allow the user to perform a computer operation.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 20:
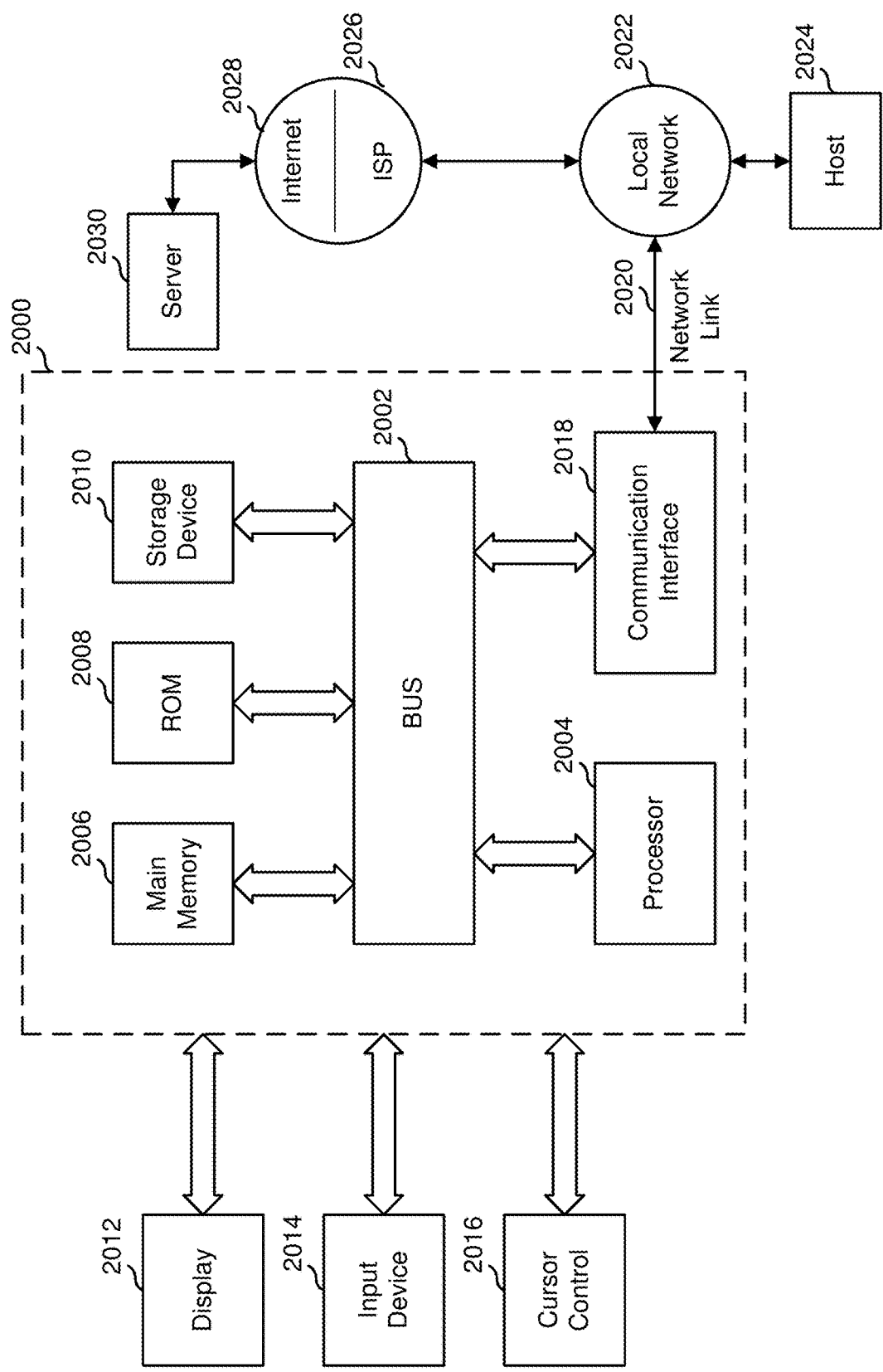
FIG. 20 is a block diagram of a computer system upon which the computer systems of the systems described herein may be implemented.

For example, FIG. 20 is a block diagram that illustrates a computer system 2000 upon which the computer systems of the systems described herein may be implemented. Computer system 2000 includes a bus 2002 or other communication mechanism for communicating information, and a processor 2004 coupled with bus 2002 for processing information. Processor 2004 may be, for example, a general-purpose microprocessor.

Computer system 2000 also includes a main memory 2006, such as a random-access memory (RAM) or other dynamic storage device, coupled to bus 2002 for storing information and instructions to be executed by processor 2004. Main memory 2006 may also be used for storing temporary variables or other intermediate information during execution of instructions to be executed by processor 2004. Such instructions, when stored in non-transitory storage media accessible to processor 2004, render computer system 2000 into a special-purpose machine that is customized to perform the operations specified in the instructions.

Computer system 2000 further includes a read only memory (ROM) 2008 or other static storage device coupled to bus 2002 for storing static information and instructions for processor 2004. A storage device 2010, such as a magnetic disk or optical disk, is provided and coupled to bus 2002 for storing information and instructions.

Computer system 2000 may be coupled via bus 2002 to a display 2012, such as a computer monitor, for displaying information to a computer user. An input device 2014, including alphanumeric and other keys, is coupled to bus 2002 for communicating information and command selections to processor 2004. Another type of user input device is a cursor control 2016, such as a mouse, a trackball, or cursor direction keys for communicating direction information and command selections to processor 2004 and for controlling cursor movement on display 2012. This input device typically has two degrees of freedom in two axes, a first axis (e.g., x) and a second axis (e.g., y), that allows the device to specify positions in a plane.

Computer system 2000 may implement the techniques described herein using customized hard-wired logic, one or more ASICs or FPGAs, firmware and/or program logic which in combination with the computer system causes or programs computer system 2000 to be a special-purpose machine. According to one embodiment, the techniques herein are performed by computer system 2000 in response to processor 2004 executing one or more sequences of one or more instructions contained in main memory 2006. Such instructions may be read into main memory 2006 from another storage medium, such as storage device 2010. Execution of the sequences of instructions contained in main memory 2006 causes processor 2004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 2010. Volatile media includes dynamic memory, such as main memory 2006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 2002. Transmission media can also take the form of acoustic or light waves, such as those generated during radio-wave and infra-red data communications.

Various forms of media may be involved in carrying one or more sequences of one or more instructions to processor 2004 for execution. For example, the instructions may initially be carried on a magnetic disk or solid-state drive of a remote computer. The remote computer can load the instructions into its dynamic memory and send the instructions over a network connection. A modem or network interface local to computer system 2000 can receive the data. Bus 2002 carries the data to main memory 2006, from which processor 2004 retrieves and executes the instructions. The instructions received by main memory 2006 may optionally be stored on storage device 2010 either before or after execution by processor 2004.

Computer system 2000 also includes a communication interface 2018 coupled to bus 2002. Communication interface 2018 provides a two-way data communication coupling to a network link 2020 that is connected to a local network 2022. For example, communication interface 2018 may be a network card, a modem, a cable modem, or a satellite modem to provide a data communication connection to a corresponding type of telephone line or communications line. Wireless links may also be implemented. In any such implementation, communication interface 2018 sends and receives electrical, electromagnetic, or optical signals that carry digital data streams representing various types of information.

Network link 2020 typically provides data communication through one or more networks to other data devices. For example, network link 2020 may provide a connection through local network 2022 to a host computer 2024 or to data equipment operated by an Internet Service Provider (ISP) 2026. ISP 2026 in turn provides data communication services through the world-wide packet data communication network now commonly referred to as the "Internet" 2028. Local network 2022 and Internet 2028 both use electrical, electromagnetic, or optical signals that carry digital data streams. The signals through the various networks and the signals on network link 2020 and through communication interface 2018, which carry the digital data to and from computer system 2000, are example forms of transmission media.

Computer system 2000 can send messages and receive data, including program code, through the network(s), network link 2020, and communication interface 2018. In the Internet example, a server 2030 might transmit a requested code for an application program through the Internet 2028, ISP 2026, local network 2022, and communication interface 2018. The received code may be executed by processor 2004 as it is received, and/or stored in storage device 2010, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method of securing a computer resource against unauthorized access by authenticating a user device attempting to access the computer resource, the method comprising:
   determining a three-dimensional (3D) model of a virtual scene, wherein elements of the virtual scene are selected consistent with human expectations;
   generating a data record for the 3D model, wherein the data record includes references to a pre-determined set of human expectations about the virtual scene;
   generating a two-dimensional (2D) image of the virtual scene by a challenge generator,
      wherein the 2D image comprises a view of dice from a virtual camera position, and
      wherein the dice are oriented such that a sum of values represented on top faces of the dice equals to an input parameter selected by the challenge generator;
   sending a challenge data structure to the user device, wherein the challenge data structure includes the 2D image;
   obtaining a user response representing a user-provided set of expectations about the virtual scene;
   determining whether the user-provided set of expectations is consistent with the pre-determined set of human expectations; and
   providing access to the computer resource for the user device based on whether the user-provided set of expectations is consistent with the pre-determined set of human expectations and the user response is equal to the input parameter selected by the challenge generator.

2. The method of claim 1, wherein the pre-determined set of human expectations correspond to placement of elements in the virtual scene that are placed consistent with commonly-held real-world human experiences with respect to the elements.

3. The method of claim 1, wherein providing access to the computer resource for the user device comprises indicating to another computer system whether to provide that access.

4. The method of claim 1, wherein the 2D image of the virtual scene is one of a plurality of image tiles provided as part of a presentation to the user device.

5. The method of claim 1, wherein the values represented on the top faces of at least some of the dice are represented as numbers.

6. The method of claim 1, wherein the values represented on the top faces of at least some of the dice are represented as pips.

7. A system for securing a computer resource against unauthorized access by authenticating a user device attempting to access the computer resource, the system comprising:
   a memory; and
   a processing device, operatively coupled to the memory, to:
      determine a three-dimensional (3D) model of a virtual scene, wherein elements of the virtual scene are selected consistent with human expectations;
      generate a data record for the 3D model, wherein the data record includes references to a pre-determined set of human expectations about the virtual scene;
      generate a two-dimensional (2D) image of the virtual scene by a challenge generator,
         wherein the 2D image comprises a view of dice from a virtual camera position, and
         wherein the dice are oriented such that a sum of values represented on top faces of the dice equals to an input parameter selected by the challenge generator;
      send a challenge data structure to the user device, wherein the challenge data structure includes the 2D image;
      obtain a user response representing a user-provided set of expectations about the virtual scene;
      determine whether the user-provided set of expectations is consistent with the pre-determined set of human expectations; and
      provide access to the computer resource for the user device based on whether the user-provided set of expectations is consistent with the pre-determined set of human expectations and the user response is equal to the input parameter selected by the challenge generator.

8. The system of claim 7, wherein, to provide access to the computer resource for the user device, the processing device is to indicate to another computer system whether to provide that access.

9. The system of claim 7, wherein the 2D image of the virtual scene is one of a plurality of image tiles provided as part of a presentation to the user device.

10. The system of claim 7, wherein the values represented on the top faces of at least some of the dice are represented as numbers.

11. The system of claim 7, wherein the values represented on the top faces of at least some of the dice are represented as pips.

12. A non-transitory computer-readable storage medium for securing a computer resource against unauthorized access by authenticating a user device attempting to access the computer resource, the non-transitory computer-readable storage medium including instructions that, when executed by a processing device, cause the processing device to:
   determine a three-dimensional (3D) model of a virtual scene, wherein elements of the virtual scene are selected consistent with human expectations;
   generate a data record for the 3D model, wherein the data record includes references to a pre-determined set of human expectations about the virtual scene;
   generate a two-dimensional (2D) image of the virtual scene by a challenge generator,
      wherein the 2D image comprises a view of dice from a virtual camera position, and
      wherein the dice are oriented such that a sum of values represented on top faces of the dice equals to an input parameter selected by the challenge generator;
   send a challenge data structure to the user device, wherein the challenge data structure includes the 2D image;
   obtain a user response representing a user-provided set of expectations about the virtual scene;
   determine whether the user-provided set of expectations is consistent with the pre-determined set of human expectations; and
   provide access to the computer resource for the user device based on whether the user-provided set of expectations is consistent with the pre-determined set of human expectations and the user response is equal to the input parameter selected by the challenge generator.

13. The non-transitory computer-readable storage medium of claim 12, wherein, to provide access to the computer resource for the user device, the processing device is to indicate to another computer system whether to provide that access.

14. The non-transitory computer-readable storage medium of claim 12, wherein the 2D image of the virtual scene is one of a plurality of image tiles provided as part of a presentation to the user device.

15. The non-transitory computer-readable storage medium of claim 12, wherein the values represented on the top faces of at least some of the dice are represented as numbers.

16. The non-transitory computer-readable storage medium of claim 12,
   wherein the values represented on the top faces of at least some of the dice are represented as pips.

\* \* \* \* \*